US006656007B2

(12) United States Patent
Fushimi et al.

(10) Patent No.: US 6,656,007 B2
(45) Date of Patent: Dec. 2, 2003

(54) METHOD OF MANUFACTURING A SPACER USED IN AN ELECTRON BEAM GENERATING DEVICE, AN ELECTRON BEAM GENERATING DEVICE USING THE SPACER AND IMAGE-FORMING APPARATUS

(75) Inventors: Masahiro Fushimi, Kanagawa (JP); Yasushi Shioya, Kanagawa (JP); Yasushi Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 09/954,073

(22) Filed: Sep. 18, 2001

(65) Prior Publication Data

US 2002/0034916 A1 Mar. 21, 2002

(30) Foreign Application Priority Data

Sep. 19, 2000 (JP) ....................................... 2000-284096
Sep. 14, 2001 (JP) ....................................... 2001-280146

(51) Int. Cl.[7] ................................................... A01J 9/24

(52) U.S. Cl. .......................................... 445/24; 313/422

(58) Field of Search ............................ 313/422; 445/24, 445/25

(56) References Cited

U.S. PATENT DOCUMENTS

| | | | | | |
|---|---|---|---|---|---|
| 4,804,887 | A | * | 2/1989 | Miyama et al. | 313/495 |
| 4,904,895 | A | | 2/1990 | Tsukamoto et al. | 313/336 |
| 5,066,883 | A | | 11/1991 | Yoshioka et al. | 313/309 |
| 5,569,974 | A | | 10/1996 | Morikawa et al. | 313/310 |
| 5,682,085 | A | | 10/1997 | Suzuki et al. | 315/169.1 |
| 5,861,712 | A | * | 1/1999 | Beetson et al. | 313/497 |
| 6,152,796 | A | * | 11/2000 | Nakata | 445/24 |
| 6,517,399 | B1 | * | 2/2003 | Ito et al. | 445/24 |

FOREIGN PATENT DOCUMENTS

| | | |
|---|---|---|
| JP | 57-118355 | 7/1982 |
| JP | 63-274047 | 11/1988 |
| JP | 64-31332 | 2/1989 |
| JP | 2-257551 | 10/1990 |
| JP | 3-49135 | 3/1991 |
| JP | 3-55738 | 3/1991 |
| JP | 4-28137 | 1/1992 |

OTHER PUBLICATIONS

M.I. Elinson et al., *The Emission of Hot Electrons and the Field Emission of Electrons from Tin Oxide*, Radio: Eng. Electron Phys., (1965) pp. 1290–1296.

Hisashi Araki et al., *Electroforming and Electron Emission of Carbon Thin Films*, Journal of the Vacuum Society of Japan, vol. 26, No. 1, (1981) pp. 22–29 (English Abstract on p. 22).

M. Hartwell et al., *Strong Electron Emission from Patterned Tin–Indium Oxide Thin Films*, International Electron Devices Meeting, Washington, D.C. (1975) pp. 519–521.

W.P. Dyke, et al., *Advances in Electronics and Electron Physics*, Academic Press Inc., (1956) pp. 90–184.

(List continued on next page.)

*Primary Examiner*—P. Austin Bradley
*Assistant Examiner*—Briggitte Hammond
(74) *Attorney, Agent, or Firm*—Fitzpatrick, Cella, Harper & Scinto

(57) ABSTRACT

The present application discloses a method of manufacturing a spacer having an excellent characteristic, and more particularly a method of efficiently manufacturing the spacer. Specifically, in a method of manufacturing a spacer used in an electron beam generating device, there is provided a step of providing a material for forming a film on a film formation surface of a spacer base substance in a state where the spacer base substance is nipped, wherein the material providing step is achieved in a state where the film formation surface is not projected from an end portion of a nipping member for nipping the spacer base substance.

15 Claims, 18 Drawing Sheets

OTHER PUBLICATIONS

C.A. Mead, *Operation of Tunnel–Emission Devices*, Journal of Applied Physics, vol. 32 (1961) pp. 646–652.

G. Dittmer, *Electrical Conduction and Electron Emission of Discontinuous Thin Films*, Thin Solid Films—Elsevier Sequoia S.A. (1972), pp. 317–328.

C.A. Spindt et al., *Physical Properties of Thin–Film Field Emission Cathodes with Molybdenum Cones*, Journal of Applied Physics, vol. 47 (1976) pp. 5248–5263.

R. Meyer, et al., *Recent Development on "Microtips" Display at Leti*, Technical Digest of IVMC 91, (1991) pp. 6–9.

* cited by examiner

METHOD OF MANUFACTURING A SPACER USED IN AN ELECTRON BEAM GENERATING DEVICE, AN ELECTRON BEAM GENERATING DEVICE USING THE SPACER AND IMAGE-FORMING APPARATUS

BACKGROUND OF THE INVENTION

1. Field of the Invention

The present invention relates to a method of manufacturing a spacer used in an electron beam generating device, an electron beam generating device using the spacer and an image-forming apparatus.

2. Related Background Art

Up to now, there have been known two sorts of electron beam emitting devices, that is, a hot cathode device and a cold cathode device as an electron source in an electron beam emitting device used in an image-forming apparatus. In the cold cathode device of those cathode devices, there have been known, for example, a surface conduction electron-emitting device, an electric field electron-emitting device (hereinafter referred to as "FE type"), a metal/insulating layer/metal electron-emitting device (hereinafter referred to as "MIM type"), and the like.

The above surface conduction electron-emitting devices are exemplified by, for example, M. I. Elinson, Radio: Eng. Electron Phys., 10,1290 (1965), and other examples that will be described later. The surface conduction electron-emitting device is so designed as to utilize a phenomenon where a current is allowed to flow to a thin film of a small-area formed on a substrate in parallel with a film surface, to thereby cause electron emission.

As the surface conduction electron-emitting device, there have been reported, in addition to the above-described surface conduction electron-emitting device using an $SnO_2$ thin film by Elinson, a surface conduction electron-emitting device using an Au thin film [G. Dittmer: "Thin Solid Films", 9,317(1972)], a surface conduction electron-emitting device using an $In_2O_3/SnO_2$ thin film [M. Hartwell and C. G. Fonstad: "IEEE Trans. ED Conf.", 519(1975)], a surface conduction electron-emitting device using a carbon thin film [Hisashi Araki, et al: Vacuum, volume 26, No. 1, 22 (1983)], and the like.

A typical example of the device structure of those surface conduction electron-emitting devices is exemplified by the above-mentioned device by M. Hartwell, et al as shown in FIG. 23. In this example, reference numeral 3001 denotes a substrate, and 3004 is a plane type electroconductive thin film of an H shape made of metal oxide formed through sputtering. Then, the electroconductive thin film 3004 is subjected to energization processing called "energization forming" which will be described later, to therefore form an electron-emitting portion 3005. Note that, in the figure, an interval L is set to 0.5 to 1 mm, and a width W is set to 0.1 mm. In this example, for the convenience of the drawing, the electron-emitting portion 3005 is indicated by a rectangular. In the center of the electroconductive thin film 3004, but this is schematic and does not faithfully represent the position and configuration of the actual electron-emitting portion.

It is general that in the surface conduction electron-emitting device including the above-mentioned device by M. Hartwell, et al, the electroconductive thin film 3004 is subjected to energization processing called "energization forming" to form the electron-emitting portion 3005. That is, the energization forming is that a constant D.C. voltage or a D.C. voltage that is boosted at a very slow rate such as 1 V/min is applied to the both ends of the electroconductive thin film 3004 to energize the electroconductive thin film 3004 so that the electroconductive thin film 3004 is locally destroyed, deformed or deteriorated, to thereby form the electron-emitting portion 3005 that is in an electrically high-resistant state.

Note that a fissure is formed in a part of the electroconductive thin film 3004 that has been locally destroyed, deformed or deteriorated. Therefore, in the case where an appropriate voltage is applied to the electroconductive thin film 3004 after the energization forming, electron emission is conducted in the vicinity of the fissure.

Also, as the examples of the FE type, there have been known, for example, W. P. Dyke & W. W. Dolan, "Field emission", Advance in Electron Physics, 8, 89(1956), C. A. Spindt, "Physical properties of thin-film fie-id emission cathodes with molybdenum cones", J. Appl. Phys., 47,5248 (1976), and the like.

As the typical example of the device structure of the FE type, the above-mentioned device by C. A. Spindt, et al is structured as shown in FIG. 24 in which reference numeral 3010 denotes a substrate, 3011 denotes an emitter wiring made of an electroconductive material, 3012 denotes an emitter cone, 3013 denotes an insulating layer, and 3014 denotes a gate electrode. In this device, an appropriate voltage is applied between the emitter cone 3012 and the gate electrode 3014, to thereby conduct the electric field emission from a leading portion of the emitter cone 3012.

Also, as another device structure of the FE type, there is an example in which an emitter and a gate electrode are disposed on a substrate substantially in parallel with a substrate surface which is not of the above-mentioned laminate structure.

Also, as an example of the MIM type, there have been known, for example, C. A. Mead, "Operation of tunnel-emission Devices, J. Appl, Phys., 32,646 (1961), and the like. A typical example of the MIM type device structure is shown in FIG. 25. In this example, reference numeral 3020 denotes a substrate, 3021 denotes a lower electrode made of metal, 3022 denotes a thin insulating layer having a thickness of about 100 Å, and 3023 denotes an upper electrode made of metal having a thickness of about 80 to 300 Å. The MIM type device is structured such that an appropriate voltage is applied between the upper electrode 3023 and the lower electrode 3021 to conduct the electron emission from the surface of the upper electrode 3023.

The above-described cold cathode device does not require a heater because the device can obtain the electron emission at a low temperature as compared with the hot cathode device. Therefore, the cold cathode device is simple in structure as compared with the hot cathode device and being capable of producing a fine device from the cold cathode device. Also, even if a large number of devices are arranged on the substrate with a high density, it is hard to generate a problem such as heat melting of the substrate. Also, in case of the cold cathode device, there is another advantage in that a response is high in speed, which is different from the hot cathode device (in which the response is low in speed because the device is operated by heating of the heater). For that reason, the applied research of the cold cathode device is increasingly conducted.

For example, the surface conduction electron-emitting device is particularly simple in its structure among the cold cathode devices, and it is easy in manufacture, and therefore has an advantage that a large number of devices can be formed over a large area. Under the circumstance, as disclosed in Japanese Patent Application Laid-Open No. 64-31332 made by the present applicant, a method in which a large number of devices are arranged on a substrate and driven is researched.

Also, as the application of the surface conduction electron-emitting device, there have been researched, for example, an image-forming apparatus such as an image display apparatus or an image recording apparatus, a charge beam source and the like. In particular, as the application to the image display apparatus, as disclosed in Japanese Patent Application Laid-Open No. 2-257551 by the present applicant, Japanese Patent Application Laid-Open No. 4-28137 and U.S. Pat. No. 5,066,883, there has been researched an image display apparatus using the combination of the surface conduction electron-emitting device with a phosphor that emits a light due to the irradiation of an electron beam.

In the image display apparatus using the combination of the surface conduction electron-emitting device with the phosphor; it is expected to have a characteristic superior to the conventional image display apparatus of other types. For example, because the above image display apparatus is of the self-emitting type even as compared with a liquid crystal display apparatus which has been spread in recent years, there are advantages that no back light is required and an angle of visual field is wide.

Also, the method in which a large number of FE type devices are arranged and driven is disclosed in U.S. Pat. No. 4,904,895 by the present applicant. Also, as an example in which the FE type device is applied to the image display apparatus, there has been known a plane type display device, for example, which is reported by R. Meyer, et al [R. Meyer: "Recent Development on Micro-tips Display at LETI", Tech. Digest of 4th Int. Vacuum Micro-electronics Conf., Nagahama, pp. 6 to 9 (1991)]. Also, an example in which a large number of MIM type devices are arranged and applied to the image display apparatus is disclosed in Japanese Patent Application Laid-Open No. 3-55738 by the present applicant.

Among the image-forming apparatus using the above-mentioned electron-emitting devices, attention is paid to a thin plane type display apparatus as the replacement of a CRT display apparatus since the thin plane type display apparatus is space-saving and light in weight.

In the above-described image-forming apparatus, in general, a spacer is arranged between a rear plate and a face plate. The spacer is so designed as to support the rear plate and the face plate so that the rear plate and the face plate withstand an atmospheric pressure, and therefore is demanded to have a sufficient mechanical strength. However, the existence of the spacer must not greatly influence the trajectory of electrons flying between the rear plate and the face plate.

Then, the main cause of giving an influence to the electron trajectory is the charge of the spacer. It is presumed that the spacer charge occurs as a result from a phenomenon in which a part of electrons emitted from the electron source or electrons reflected from the face plate enter the spacer and secondary electrons are emitted from the spacer, or ions that have been ionized due to the collision of electrons are attached onto the surface.

When the spacer is positively charged, the electrons flying in the vicinity of the spacer are attracted to the spacer. Therefore, a distortion occurs in a displayed image in the vicinity of the spacer. Moreover, the influence of the charge becomes more remarkable as an interval between the rear plate and the face plate is larger.

In general, as means for suppressing the charge, electroconductivity is given to the charged surface and a slight current is allowed to flow in the charged surface to remove the electric charges. A method in which this concept is applied to the spacer to coat the spacer surface with tin oxide or the like is disclosed in Japanese Patent Application Laid-Open No. 57-118355. Also, a method in which the spacer surface is coated with PdO glass material is disclosed in Japanese Patent Application Laid-Open No. 3-49135.

Also, the formation of electrodes on the abutment surfaces of the spacer against the face plate and the rear plate makes it possible to prevent the destruction of the spacer due to the connection failure or the current concentration by uniformly applying an electric field to the coating material. This appearance will be described with reference to FIG. 26. In the figure, reference numeral 901 denotes a spacer, 902 denotes a face plate, 903 denotes a rear plate, 904 denotes a higher resistant film coated on the spacer surface, 905 denotes a spacer electrode formed on the spacer, 906 denotes an abutment surface of the spacer at the face plate side, and 907 denotes an abutment surface of the spacer at the rear plate side. The spacer electrode 905 is normally formed by using a method such as sputtering.

Also, Japanese Patent Application Laid-Open No. 2000-164129 discloses a structure in which a plurality of spacer base substances are fixed in such a manner that both side surfaces of each spacer base substance are nipped by a glass fitting jig, and a lower resistant film is formed on an end portion of the spacer base substance that is exposed from the glass fitting jig through sputtering.

SUMMARY OF THE INVENTION

A spacer in an electron beam generating device is a very important member, and a method of excellently manufacturing the spacer is demanded at present. Therefore, an object of the present invention is to realize a method of manufacturing an excellent spacer.

In particular, if a film is formed in an undesired region of the spacer, there arises such a problem that an unexpected discharge occurs. Another object of the present invention is to realize a method of manufacturing a spacer that can suppress the formation of a film in an undesired region.

In order to achieve the above objects, according to a first aspect of the present invention, there is provided a method of manufacturing a spacer used in an electron beam generating device, comprising the step of providing a film formation material to a film formation surface of the spacer in a state where a spacer base substance is nipped, wherein the providing step is conducted in a state where the film formation surface is not projected from an end portion of a nipping member for nipping the spacer base substance.

According to this manufacturing method, because the film formation material is provided in a state where the film formation surface is not projected from the end portion of the nipping member, the formation of the film on a side surface of the film formation surface is suppressed.

In particular, in a case where the film to be formed is a film that is high in electroconductivity and forms an electrode, there is the possibility that the formation of the film in the undesired region leads to an undesired discharge. In the case where such a film is formed, the present invention can be particularly preferably applied.

In particular, the present invention can be preferably applied to a structure in which the electron beam generating device includes a first plate where an electron-emitting device is arranged, and a second plate where an acceleration electrode to which an acceleration potential that accelerates electrons emitted from the electron-emitting device is applied.

Also, in particular, in the case where the film formation surface is a surface that faces the first plate or the second plate when the electron beam generating device is structured, the possibility that the formation of an undesired film on the side surface of the film formation surface leads to discharge becomes high. Therefore, the present invention can be preferably applied to this structure. As a structure where a film is formed on a surface that faces the first plate or the second plate when the electron beam generating device is structured, there are, for example, a structure in which a film is formed at a position that is in contact with a wiring (electrode) formed on the first plate, in particular, a wiring that supplies a signal for driving the electron-emitting device, a structure in which a film is formed at a position that is in contact with an acceleration electrode formed on the second plate, and a structure in which a film is formed at a position that is in contact with electrodes (grid electrode, converging electrode) disposed between the first plate and the second plate.

Note that the above-described respective inventions can be preferably applied to a structure in which the plurality of spacer substrates are held in a state where the nipping members are arranged between the respective spacer base substances to give the above material.

Also, it is preferable that the end portion of the nipping member is projected from the film formation surface at the time of providing the material, and corner portions of the projected end portion are rounded. The structure has the advantages that a defect of the nipping member is suppressed, an opening portion structured by a pair of nipping members that nips the spacer base substance has a portion whose opening width in the nipping direction is widened gradually toward the external of the opening from the film formation surface so that the attainment of the material toward the film formation surface becomes excellent.

Note that in the above-described respective inventions, the spacers have electroconductivity and are electrically connected to two different electrodes, and those respective inventions can be particularly preferably applied to a structure in which potentials different from each other are given to the two different electrodes. In the case where the spacer is electrically connected to an accelerating electrode, a grid electrode or an electrode such as a driving wiring of the electron-emitting device, in order that the electric connection is made excellent, and the potential distribution in the spacer is made excellent, it is preferable that the spacer has a film high in electroconductivity. In particular, when the high electroconductivity is given to the entire spacer, the two electrodes to which the spacer is electrically connected are short-circuited, and therefore it is better that the spacer base substance is made of insulating or high resistant material, and a film high in electroconductivity is formed on only a given portion. It is preferable that the film high in the electroconductivity is formed on only the end surface of the spacer (there is no go-around from the end surface to the side surface), and the present invention can be preferably applied to the formation of the above film.

The above-described respective inventions can be particularly preferably applied to a structure in which the spacer base substance is formed of the insulating base substance, and the spacer has the film formed through the giving process and an electroconductive film other than the above film. Note that the giving process may be conducted on the spacer base substance on which the electroconductive film has been formed. Also, the electroconductive film is preferably formed of a film higher in sheet resistance than the film formed through the giving process, and more particularly a higher resistant film.

Also, in the above-described respective inventions, it is preferable that the nipping member has such a shape as to set the end portion of the nipping member to be projected from the film formation surface by 5 μm or more when the material is provided. More preferably, the end portion of the nipping member is projected from the film formation surface by 10 μm or more. The setting of those values makes it possible to surely suppress the formation of the film in an unnecessary region.

Also, in the above-described respective inventions, it is preferable that a length by which the end portion of the nipping member is projected from the film formation surface is set to 10 mm or less. In particular, in the case where the providing of the material is conducted through an electron beam vapor depositing method, it is preferable that the length is set to 8 mm or less.

According to another aspect of the present invention, there is provided an electron beam generating device characterized by providing an electron-emitting device and a spacer manufactured in the methods described in the above-mentioned respective inventions.

Also, according to still another aspect of the present invention, there is provided an image-forming apparatus comprising: an electron-emitting device; an acceleration electrode that accelerates electrons emitted from the electron-emitting device; a phosphor that emits a light by irradiation of the electrons emitted from the electron-emitting device; and a spacer manufactured through the methods described in the above-mentioned respective inventions.

It is possible that a higher resistant film is formed on the surface of the spacer, and positive charges are neutralized to ease the electric charges to prevent the electrons flying in the vicinity of the spacer from being attracted to the spacer. Also, as described above, electrodes are formed on the abutment surfaces of the spacer against the face plate and the rear plate, and an electric field is uniformly applied to the coating material, thereby being capable of preventing the spacer from being destroyed due to a connection failure or a current concentration.

Also, by implementing the present invention, it is suppressed that the electrode of the spacer is protruded to the charged surface due to the degrade of the formation precision at the time of forming the electrode to cause an adverse effect on the electron frajectory so that the situation where the electron beam cannot reach a desired position is suppressed. As a result, the distortion of a display image in the vicinity of the spacer is suppressed, thereby being capable of forming a high-grade image.

Also, as the embodiment modes of the present invention, it is preferable that the above-mentioned higher resistant film is structured by forming a metal oxide film, carbon, an alloy nitride film or the like through any one of a sputtering method, a CVD method, a plasma CVD method and an alkoxide coating method. Also, it is preferable that the spacer electrode is made of a material selected from metal or alloy such as Ni, Cr, Au, Mo, W, Pt, Ti, Al, Cu, Pb or the like having a lower resistance than the above higher resistant film, printing conductor made of metal or metal oxide such as Pd, Ag, Au, Ru—Ag or the like and glass or the like, and transparent conductor such as $In_2O_3$—$SnO_3$, and semiconductor material such as polysilicon.

Further, it is preferable that the sheet resistance of the film formed through one or more processes including at least the above providing process is smaller than the sheet resistance of the higher resistant film, and in particular, it is desirable that the former is smaller than the latter by double figures or more.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
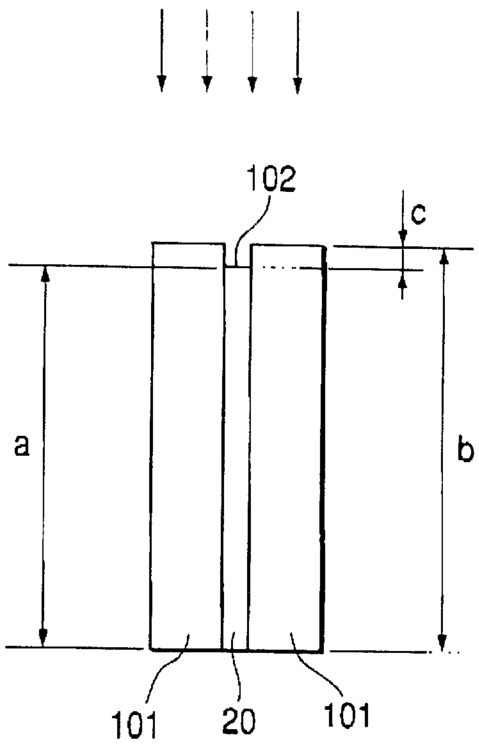
FIG. 1 is a cross-sectional view showing a spacer and a spacer block that nips the spacer for explanation of an outline of the present invention.

Hereinbelow, a first embodiment of the present invention will be specifically described with reference to the drawings. First, a basic manner of manufacturing a spacer in accordance with the present invention will be described with reference to FIG. 1. In this embodiment, the present invention is applied to a structure in which a film high in electroconductivity is formed on a spacer to be used as an electrode. A film is formed and completed to form a spacer, and the film is formed on a substance (spacer base substance) on which the film has not yet been formed. However, in the following description, the spacer base substance is also called "spacer" within a range where understanding of the technical significance of the present invention is not confused. In FIG. 1, reference numeral 101 denotes spacer blocks that are nipping members used when an electrode is formed; 20 denotes a spacer; and 102 denotes a film formation surface on which an electrode is formed. Since the spacer in this embodiment is abutted against another electrode (a wiring for supplying a signal to an acceleration electrode or to an electron-emitting device) on this film formation surface in the electron beam generating device, the film formation surface is also called an "abutment surface" in the following description.

In this example, the height b of the spacer blocks 101 and the height a of the spacer 20 satisfy $a \leqq b$. In this example, the projected length c of the spacer block that is the nipping member used when the film is formed from the film formation surface is b−a. The spacer 20 is nipped between the spacer blocks 101, and after an electrode material has been formed on an edge of the spacer 20 from a direction indicated by an arrow by a sputtering method or the like, the spacer 20 is extracted from the spacer blocks 101, thereby being capable of forming an electrode (which will be described later) on only the abutment surface 102 of the spacer.

In this situation, since a difference in distance between a and b depends on the sputtering method and the device to be used, it is necessary to use an optimum value to this condition. It is desirable that the size of the projected length c (in this example, c=b−a) is set to 10 mm or less in the sputtering, preferably 5 mm or less. Also, in the electron beam vapor deposition, it is desirable that the projected length c is set to 8 mm or less, preferably 3 mm or less. Note that the difference between the former and the latter is caused because the electrode material is liable to be deposited on the abutment surface due to go-around in the sputtering method. Further, if the minimum value of the projected length c is set to 0 or more, the effect of the present invention is obtained. However, it is possible to improve a yield by making the minimum value slightly larger taking a machining precision of the spacer and the spacer block, and a displacement of the location at the time of forming the electrode. In particular, if the shape of the nipping members is set such that the protruded length is set to 5 μm or more, preferably 10 μm or more, the displacement of location when the nipping members are so fitted as to nip the spacer base substance can be satisfactorily permitted.

Figure 2:
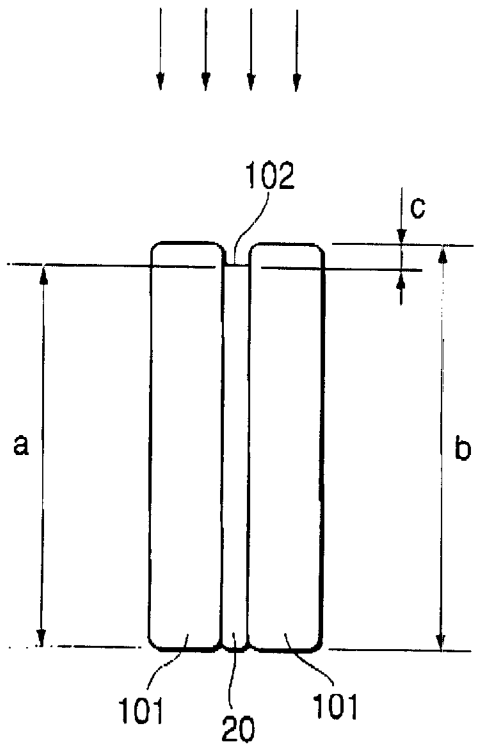
FIG. 2 is a cross-sectional view showing a spacer and a spacer block that nips the spacer in accordance with another mode of the present invention.

Also, FIG. 2 shows an example in which the corner portions of the edge of the spacer block are rounded with a required curvature. With the provision of the rounded corner portions of the spacer block, even if the block is made of a brittle material, it can be suppressed that a fissure occurs on the corner portions of the block in a process of producing the electrode to produce a defective product during the electrode formation. Also, even if a metal material is used for the block, it is possible to suppress the ratio of generating the defective products caused by the deformation of shape that may rarely occur during the working process. Also, with the rounded protruded end portion from the film formation surface of the nipping member, the opening portion that surrounds the film formation surface (made up of the end portions of a pair of nipping members) becomes gradually widened toward the opening end, resulting in such an effect that the film material readily reaches the film formation surface.

In this example, it is desirable that the radius of curvature is set to be smaller than the protruded length c, and in this example, it is sufficient that the height a of the spacer 20 is set to be smaller than a value resulting from subtracting the radius of curvature from the height b of the block. Also, although an appropriate value is changed depending on the size of the spacer 20, the material of the block and the like, its effectivity can be recognized In the case where it is set to about R=0.1 mm or more.

Figure 3:
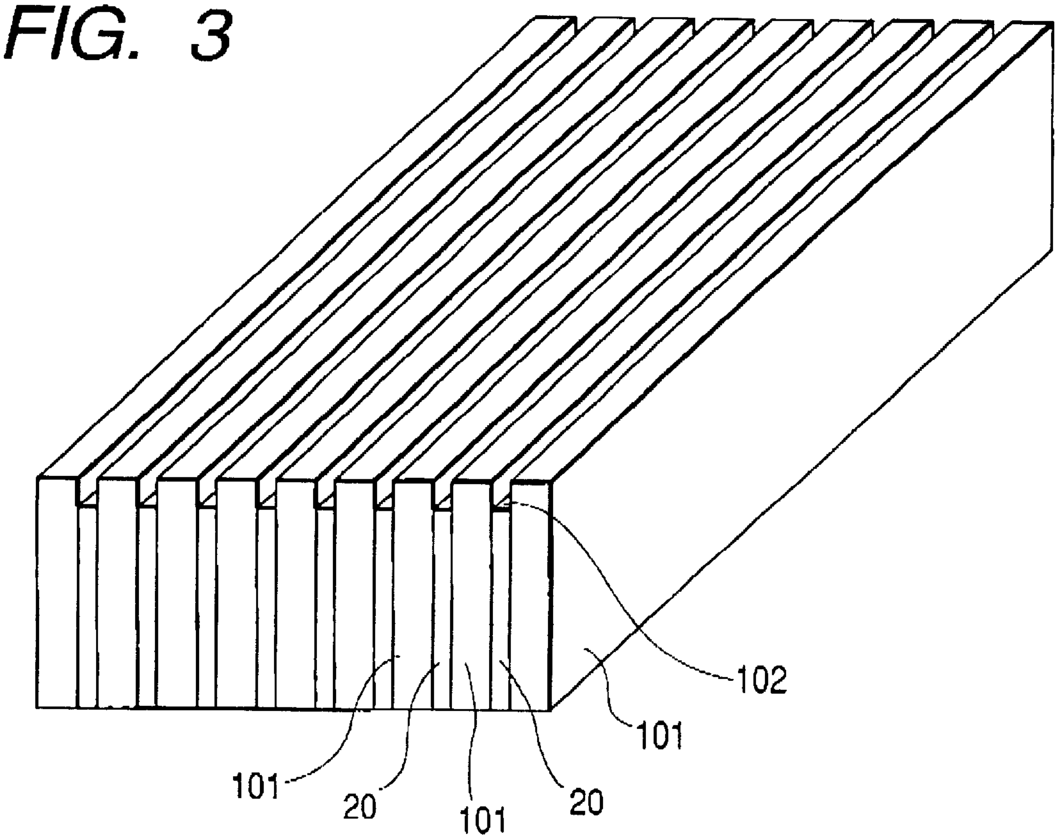
FIG. 3 is a perspective view showing a state in which a spacer and a spacer block are combined together in accordance with a first embodiment of the present invention.

As shown in FIG. 3, when a large number of spacer blocks 101 of which the length of one side is larger than that of the spacer 20 are employed, it is possible to form the electrode (refer to FIG. 4) on the edge of the spacer which is excellent in mass production when the electrode 110 is formed so as to nip the spacer 20. In particular, according to the structure of this embodiment, the spacer base substance and the nipping members are urged against the same plane at an end surface side opposite to the film formation surface due to the gravity or the like, thereby being capable of setting the protruded length on the basis of a difference in height between the spacer base substance and the nipping member. As a result, the spacer can be manufactured with a high precision and in a short period of time.

Figure 5:
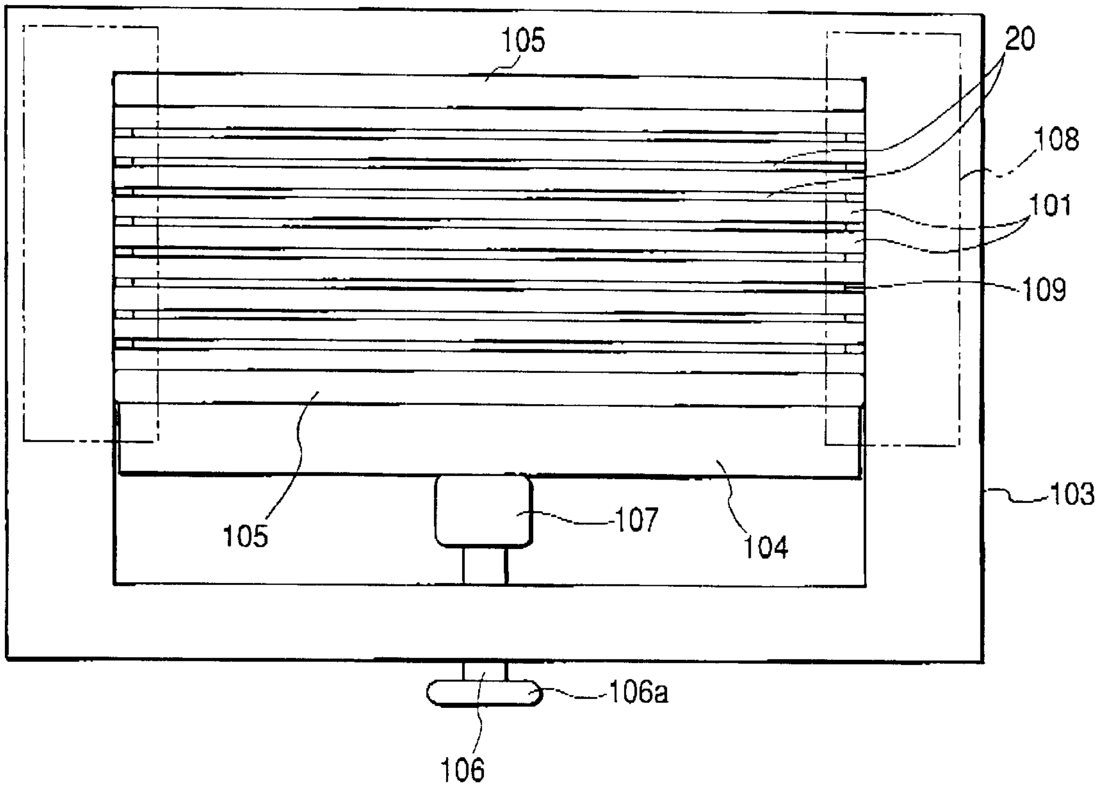
FIG. 5 is a top view showing a jig used when the electrode is formed on an edge of the spacer.
Figure 6:
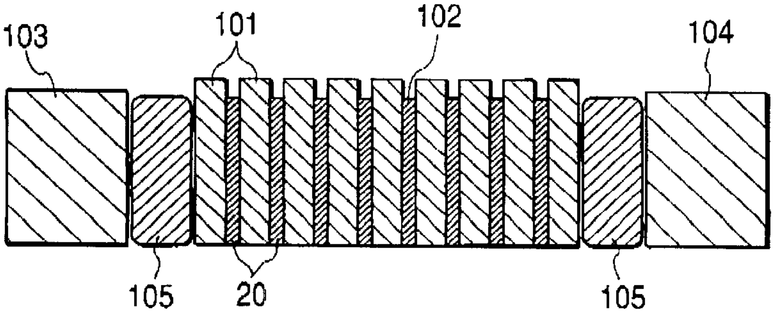
FIG. 6 is a longitudinal cross-sectional view showing the jig.

A specific device for the electrode formation and its applied embodiment will be described with reference to FIG. 5. In this example, reference numeral 101 denotes a spacer block; 20 denotes a spacer; 102 denotes a spacer electrode formation surface exposed between the spacer blocks 101; 103 denotes an square-shaped frame member in a plan view; 104 denotes an urging member; 105 denotes a rubber plate; 106 denotes a feed screw that is meshed with the frame member 103 for urging the urging member 104; 107 denotes a leading portion (push pressure transmitting portion) of the feed screw 106; 108 denotes a mask plate (indicated by an ideal line) located on the frame member 103: and 109 denotes an exposed spacer side surface.

In this example, a large number of spacers 20 are nipped between a large number of blocks 101, and disposed between one inner surface of the frame member 103 and the urging portion 104 through the rubber plate 105 from the nipping direction. The fitting of the spacer is realized by rotating the feed screw 106 that is meshed with the frame member 103 by means of a handle portion **106*a* to apply a push pressure to the urging plate 104 through the leading portion 107. In this example, the rubber plate 105 has a function of uniformly applying the push pressure to the block 101**.

In this embodiment, the size of the spacer 20 is set to 300 mm×1.8 mm×0.2 mm, and the size of the spacer block 101 is set to 340 mm×2.4 mm×1.5 mm. Also, the radius of curvature of the corner portions of the block is set to 0.1 mm. In addition, the spacer 20 and the spacer block 101 are made of glass material and heated at a temperature close to a softening point, and therefore elongated in one direction, to thereby form the electrode. Also, the rubber plate 105 is made of silicon rubber, the jig except for the screw is made of aluminum material, and the screw is made of brass material.

Also, the mask 108 is formed of an aluminum plate as a mask at the time of forming the spacer electrode 110 so that the electrode is not formed on both end portions of the spacer. This leads to an effect that in the case where the electrode material goes around the side surface portion 109 to form the electrode, discharge that rarely occurs by an image-forming apparatus using this spacer can be prevented in advance.

Also, in this embodiment, as a film formed in the present invention, a Pt electrode that forms the spacer electrode 110 is formed through the sputtering method. That is, the above-described jig that fits the spacer 20 is located on a sputtering device (not shown), and high-frequency sputtering is conducted in an argon atmosphere, to thereby form the Pt electrode with a thickness of 0.1 μm. Also, in order to improve the adhesion of the spacer 20 and Pt, after Ti has been formed in a thickness of 0.05 μm on the surface of the spacer 20, the Pt electrode is formed.

Figure 4:
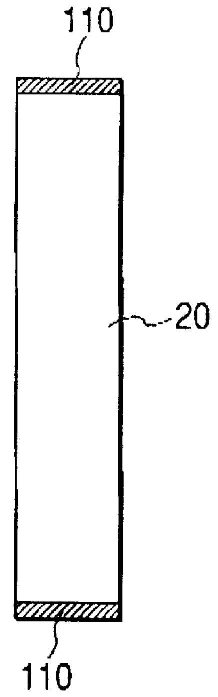
FIG. 4 is a cross sectional view showing a spacer on which an electrode has been formed.

After the sputtering has been made as described above, the spacer 20 is extracted from the blocks 101 and turned over. Then, the spacer 20 is again located between the blocks 101, and the same processing is repeated, thereby being capable of forming the spacer electrodes 110 on only the upper and lower surfaces of the spacer 20 as shown in FIG. 4.

(An Electron Beam Generating Device and an Image Display Apparatus Both Using a Spacer in Accordance with the Present Invention)

Figure 7:
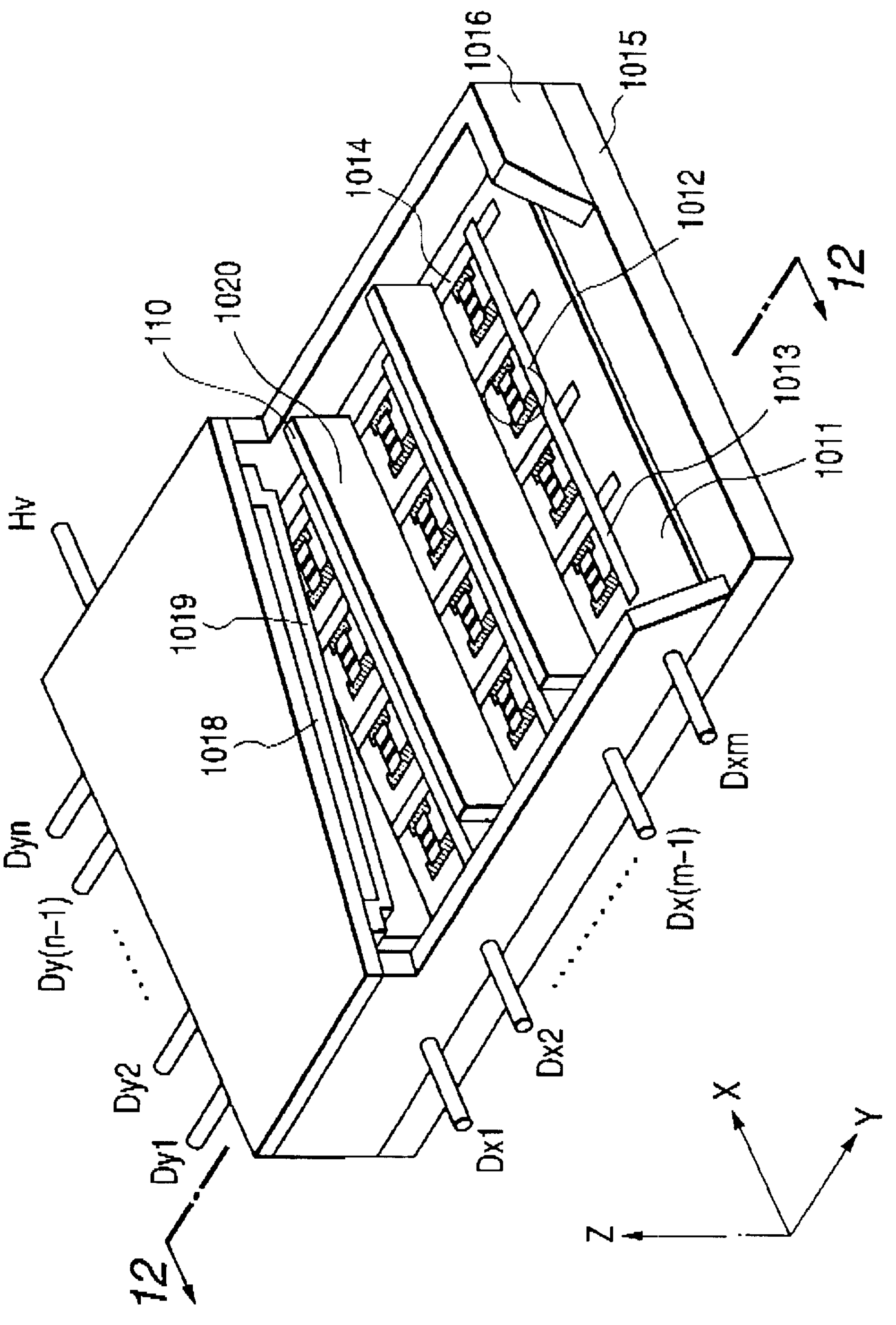
FIG. 7 is a perspective view for explaining an electron beam generating device and an image-forming apparatus using a spacer in accordance with the first embodiment of the present invention.

A description will be given in more detail of the structures of an electron beam generating device and an image display apparatus using a spacer obtained through a spacer manufacturing method of the present invention together with the structure of its display panel. FIG. 7 is a perspective view showing a display panel in accordance with the present invention, where a part of the panel is cut out to show an internal structure. In the figure, reference numeral 1015 denotes a rear plate; 1016 denotes a side wall; 1017 denotes a face plate, and those members 1015 to 1017 constitute an air-tight vessel (so called "envelope") for maintaining the interior of the display panel in vacuum.

In assembling the air-tight vessel, in order to make the joint portions of the respective members maintain the sufficient strength and air-tight property, it is necessary to seal-bond the air-tight vessel. The seal bonding can be achieved in such a manner that, for example, flit glass is coated on the joint portions, and then baked at 400 to 500° C. for 10 minutes or longer in an atmosphere or in a nitride atmosphere. A method of exhausting gas in the interior of the air-tight vessel in vacuum will be described later. Also, since the interior of the air-tight vessel is maintained in vacuum of about $10^{-6}$ Torr, in order to structure the air-tight vessel as an atmospheric pressure resistant structural body for the purpose of preventing the destruction of the air-tight vessel due to the atmospheric pressure, an accidental impact or the like, a spacer 1020 (corresponding to the above-mentioned spacer 20) is disposed in the interior thereof.

Also, as a result of using the above-mentioned spacer formed through the manufacturing method of the present invention as the electron beam generating portion of the image-forming apparatus, there can be provided a high-grade image-forming apparatus without any disturbance of the electron frajectory in the vicinity of the spacer.

The image-forming apparatus is exemplified in the above description, but the electron beam generating device according to the present invention may have the following modes.

1) The electron beam generating device has an accelerating electrode 1012 that accelerates the electrons emitted from an electron source and accelerates the electrons emitted from the cold cathode device 1012 due to an acceleration potential that is applied to the acceleration electrode in response to an Input signal, and irradiates the accelerated electrons onto a target, thereby being capable of structuring an image-forming apparatus that forms an image. In particular, there can be structured an image display apparatus where the above target is a phosphor 1018.

2) The cold cathode device 1012 is a cold cathode device having an electroconductive film including an electron-emitting portion between a pair of electrodes and preferably a surface conduction electron-emitting device.

3) The electron source is an electron source of a passive matrix arrangement having a plurality of cold cathode elements 1012 in which a plurality of row-directional wirings 1013 and a plurality of column-directional wirings 1014 are arranged in a matrix.

4) The above electron source is an electron source of a ladder-like arrangement in which a plurality of rows of the plurality of cold cathode devices 1012 that are disposed in parallel with each other and connected to each other at both ends thereof are disposed (called "row direction"), and the electrons from the cold cathode device 1012 is controlled by a control electrode (also called "grid") that is disposed above the cold cathode device 1012 along a direction (called "column direction") orthogonal to the above wirings.

5) Also, the concept of the present invention is not limited to a preferred image-forming apparatus for display, but a light emitting diode of an optical printer made up of a photosensitive drum or a light emitting diode can be used in the above-described image-forming apparatus as a substitute light emitting source. Also, in this situation, the above-mentioned m row-directional wirings and n column-directional wirings are appropriately selected, thereby being capable of applying the light emitting source to not only a linear light emitting source but also a two-dimensional light emitting source. In this case, the image forming member is not limited to a material that directly emits a light such as a phosphor used in the following embodiment, but can be applied with a member where a latent image is formed due to the charge of electrons.

Also, according to the concept of the present invention, the present invention can be applied to a case in which a member to which the electrons emitted from the electron source are irradiated is a member except for the image forming member such as a phosphor Accordingly, the present invention can be applied as a general electron beam device that does not specify the member to be irradiated.

Subsequently, a description will be given of an electron-emitting device substrate that is capable of being used in the image-forming apparatus of the present invention. As the system of arranging the cold cathode devices 1012, there are a ladder-like arrangement in which the cold cathode devices are disposed in parallel with each other, and both ends of the respective devices are connected to each other by wirings (hereinafter referred to as "ladder-like arrangement electron source substrate"), and a passive matrix arrangement (hereinafter referred to as "matrix arrangement electron source substrate") in which the respective X-directional wirings and Y-directional wirings of a pair of device electrodes of the cold cathode device 1012 are connected to each other. Note that the image-forming apparatus having the ladder-like arrangement electron source substrate requires a control electrode (grid electrode) that is an electrode for controlling the flying of the electrons from the electron-emitting device.

The rear plate 1015 is fitted with a substrate 1011, and on the substrate 1011 are formed N×M cold cathode devices 1012 (N and M are positive integers of 2 or more and appropriately set in accordance with the number of display pixels in question, and for example, in a display device for the purpose of displaying a high-quality television, it is desirable to set the number of N=3000 and M=1000 or more). The N×M cold cathode devices are arranged in a passive matrix wiring by m row-directional wirings 1013 and N column-directional wirings 1014. A part made up of those members 1011 to 1014 is called "multi electron beam source".

The multi electron beam source used in the image display apparatus of the present invention is not limited by the material, the shape or the manufacturing method of the cold cathode device if the cold cathode device is a passive matrix wiring or a ladder-like arranged electron source. Therefore, for example, it is possible to use the surface conduction electron-emitting device or the FE type or MIM type cold cathode device.

Figure 8:
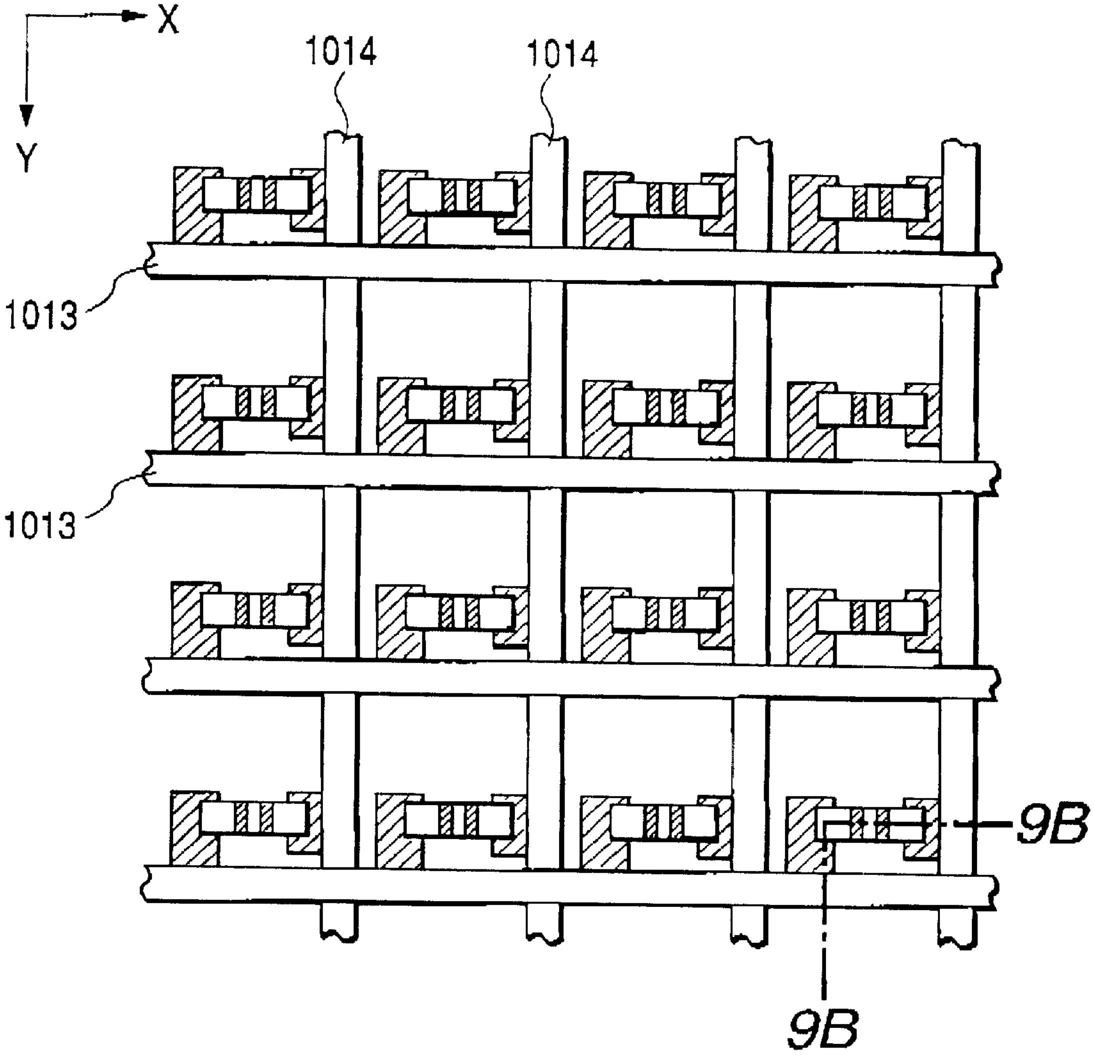
FIG. 8 is a plan view showing a substrate of multi electron beam sources.
Figure 9A:
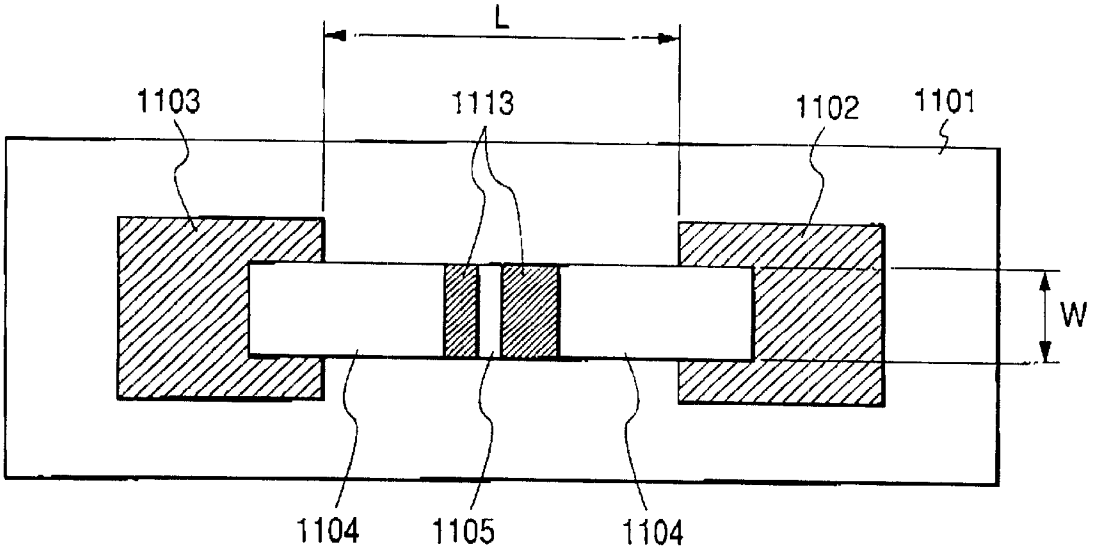
FIGS. 9A and 9B are a plan view and a cross-sectional view showing a plane type surface conduction electron-emitting device, respectively.
Figure 9B:
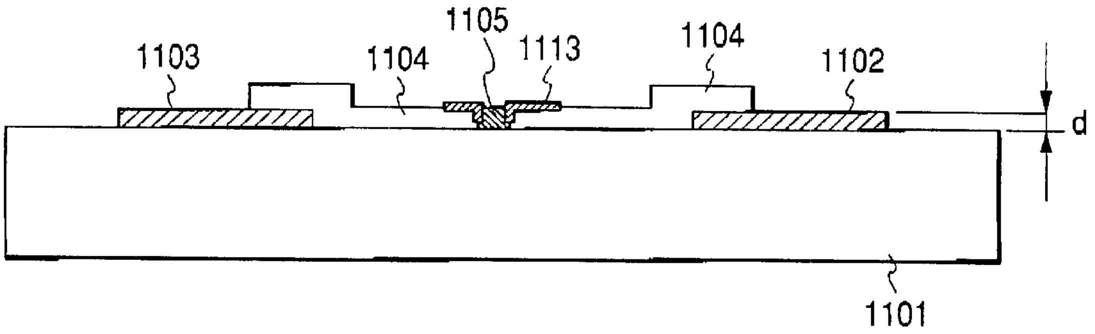

Subsequently, a description will be given of the structure of the multi electron beam source in which the surface conduction electron-emitting devices (which will be described later) are arranged on a substrate in a passive matrix wiring as the cold cathode device 1012. FIG. 8 is a plan view showing the multi electron beam source used for the display panel shown in FIG. 7. On the substrate 1011 are surface conduction electron-emitting devices as shown in FIGS. 9A and 9B, and those devices are arranged in a passive matrix due to the row-directional wirings 1013 and the column-directional wirings 1014. An insulating layer (not shown) is formed at each of the portions where the row-directional wirings 1013 and the column-directional wirings 1014 cross each other between the electrodes, to thereby keep an electric insulation.

An enlarged view of FIG. 8 is shown in FIG. 9A. Also, a cross section along a line 9B—9B of FIG. 8 is shown in FIG. 9B. The multi electron source thus structured is manufactured in such a manner that after the row-directional wirings 1013, the column-directional wirings 1014, inter-electrode insulating layers (not shown) and the device electrodes of the surface conduction electron-emitting device and the electroconductive thin film have been formed on the substrate in advance, an electricity is supplied to the respective devices through the row-directional wirings 1013 and the column-directional wirings 1014 to conduct an energization forming operation (which will be described later) and an energization activation operation (which will be described later).

In this embodiment, the substrate 1011 of the multi electron beam source is fitted onto the rear plate 1015 of the air tight vessel. However, in the case where the substrate 1011 per se of the multi electron beam source has a sufficient strength, the substrate 1011 per se of the multi electron beam source may be used as the rear plate of the air tight vessel. Also, a fluorescent film 1018 is formed on a lower surface of the face plate 1017.

Figure 10A:
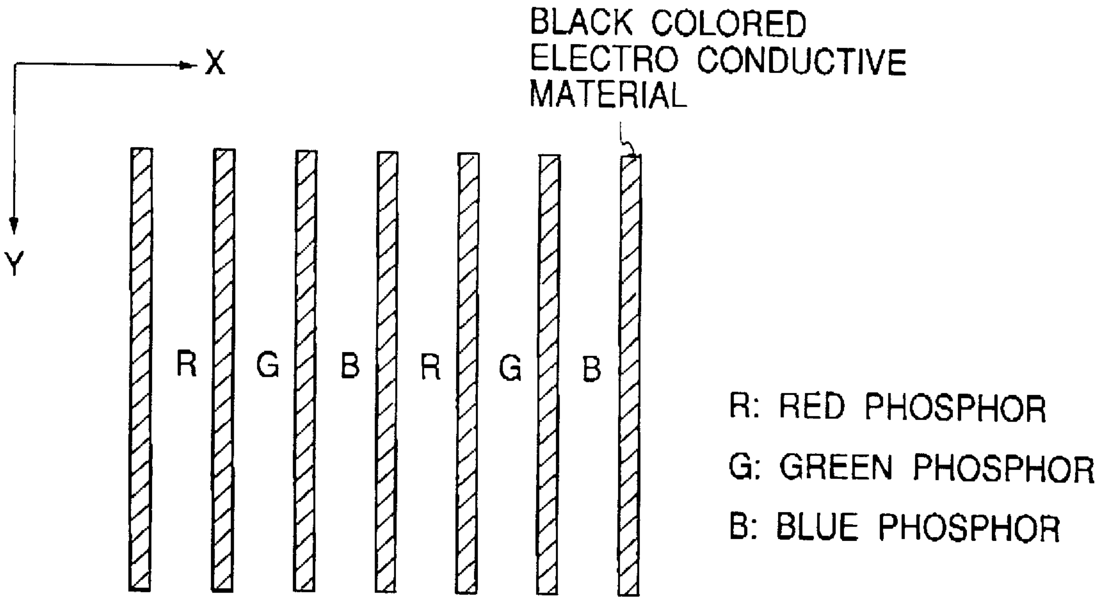
FIGS. 10A and 10B are plan views exemplifying a phosphor arrangement on a face plate of a display panel.
Figure 10B:
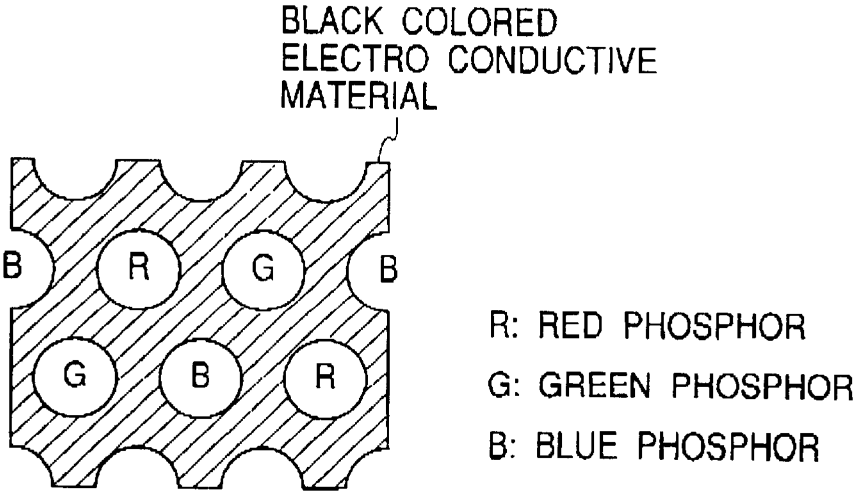
Figure 11:
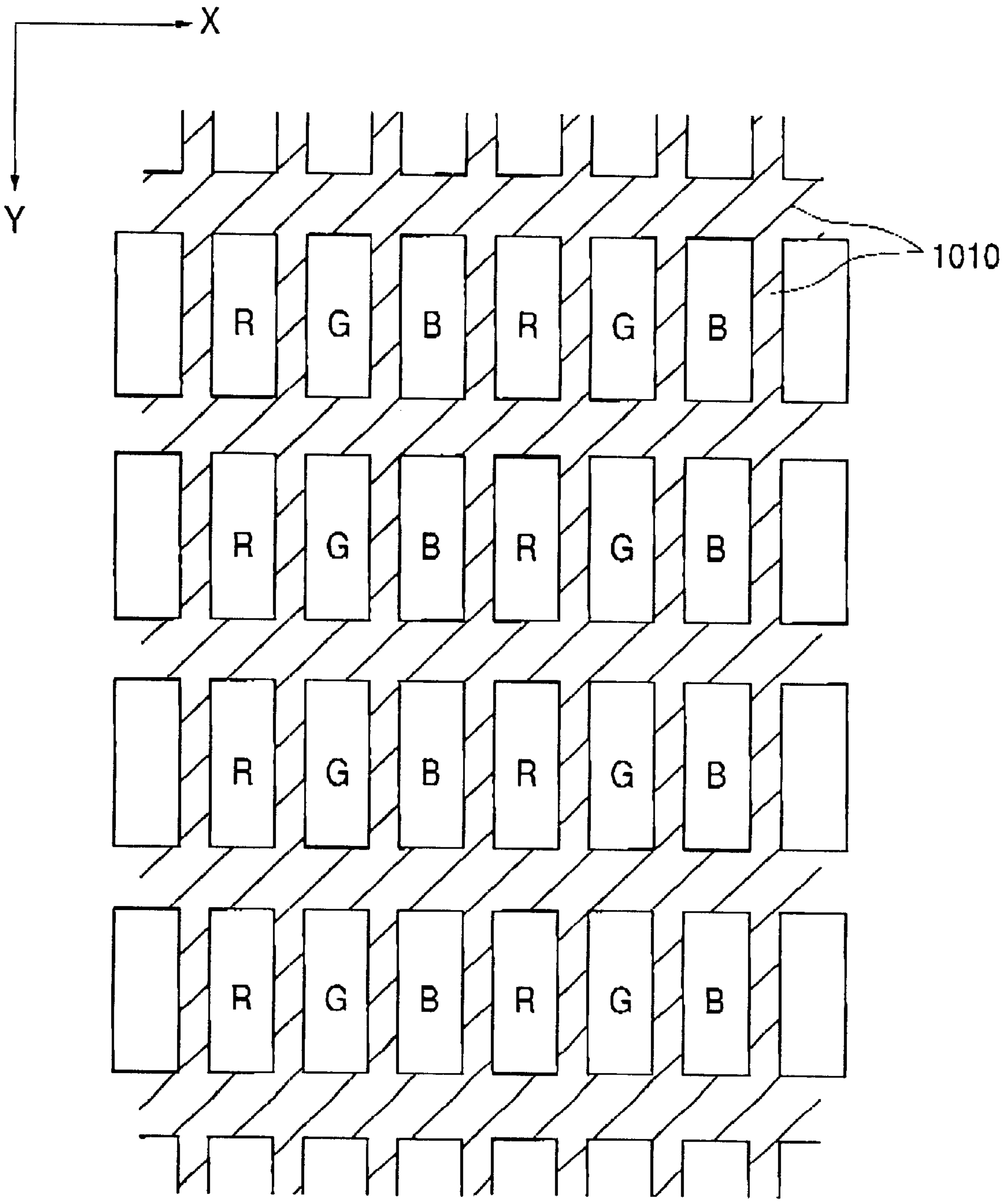
FIG. 11 is a plan view exemplifying another phosphor arrangement.

Also, in this example, since the color display apparatus is structured, phosphors of three primary colors consisting of red, green and blue used in the field of an CRT are selectively painted on the portion of the fluorescent film 1018. The phosphors of the respective colors are selectively painted in the form of stripes as shown in FIG. 10A, and a black electroconductor 1010 is disposed between the respective stripes of the phosphors. The purposes of providing the black electroconductor 1010 are that even if a position onto which the electron beam is irradiated is slightly shifted, display colors are prevented from shifting, the reflection of external light is prevented to prevent the deterioration of the display contrast, the charge-up of the fluorescent film due to the electron beam is prevented, and the like. The black electroconductor 1010 mainly contain black lead. However, other material may be used if the material is suitable for the above purpose. Also, the selective painting of the phosphors of three primary colors is not limited to a stripe-shaped arrangement shown in FIG. 10A, but may be in a deltoid arrangement shown in FIG. 10B, for example, or other arrangements (for example, the shape and arrangement of FIG. 11) other than the deltoid arrangement.

In the case of manufacturing a monochrome display panel, a single-color phosphor material may be used for the fluorescent film 1018, and also the black electroconductor material is not necessarily used. Also, a metal back 1019 that is well-known in the field of a CRT is disposed on a surface of the fluorescent film 1018 at the rear plate side. The purposes of disposing the metal back 1019 are that a part of light emitted from the fluorescent film 1018 is mirror-reflected to improve the light utilization ratio, the fluorescent film 1018 is protected from the collision of negative ions, the metal back 1019 is allowed to function as an electrode for applying the electron beam acceleration voltage, and the metal back 1019 is allowed to function as an electroconductive path of the electrons that excite the fluorescent film 1018.

The metal back 1019 is formed through a method in which after the fluorescent film 1018 has been formed on a face plate substrate 1017, the fluorescent film surface is smoothed, and Al is then vacuum-evaporated on the fluorescent film surface. In the case where a fluorescent material for a low voltage is used for the fluorescent film 1018, no metal back 1019 is used.

Also, although being not used in this embodiment, for the purpose of applying an acceleration voltage and improving the electroconductivity of the fluorescent film, a transparent electrode made of, for example, ITO may be disposed between the face plate substrate 1017 and the fluorescent film 1018.

Figure 12:
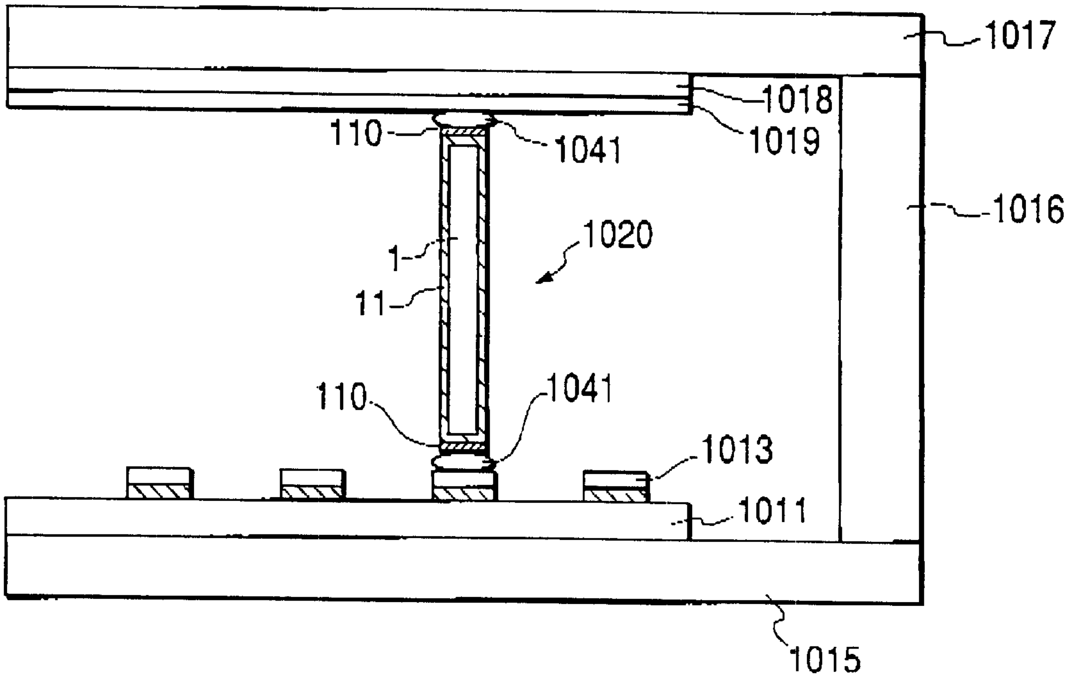
FIG. 12 is a cross-sectional view showing a display panel taken along a line 12—12 in accordance with the first embodiment of the present invention.

FIG. 12 schematically shows a cross section along a line 12—12 of FIG. 7, and reference numerals of the respective parts correspond to those in FIG. 7. The spacer 1020 is formed of an electrode 110 where the higher resistant film 11 for preventing charge is formed on the surface of the insulating member 1, and the lower resistant films are formed on the abutment surfaces that face the inner side (metal back 1019 or the like) of the face plate 1017 and the surface (row-directional wirings 1013 or column-directional wirings 1014) of the substrate 1011. The required number of spacers 1020 are disposed at necessary intervals to achieve the above purpose (reinforcement), and fitted to the inner side of the face plate 1017 and the surface of the substrate 1011 by a bonding material 1041.

Also, the higher resistant film 11 is formed on at least a surface of the insulating member 1 which is exposed to vacuum within the air-tight vessel, and the higher resistant film 11 is electrically connected to the inner side (metal back 1019 and the like) of the face plate 1017 and the surface (row-directional wirings 1013 or the column-directional wirings 1014) of the substrate 1011 through the lower resistant film (an electrode which is a film formed in accordance with the present invention) 110 on the spacer 102 and the bonding material 1041.

In a mode that will be described herein, the spacers 1020 are formed into a shape of a thin plate that erects between the face plate 1017 and the substrate 1011, arranged in parallel with the row-directional wirings 1013 and electrically connected to the row-directional wirings 1013. The spacers 1020 are required to have an insulating property sufficient for withstanding a high voltage that is applied between the row-directional wirings 1013 and the column-directional wirings 1014 on the substrate 1011 and the metal back 1019 of the Inner surface of the face plate 1017, and also have the electroconductivity of the degree that prevents the charge on the surface of the spacer 1020.

The insulating member 1 of the spacer 1020 may be made of a glass such as a quartz glass, a glass of which impurity contents such as Na is reduced, and a soda lime glass, or may be made of a ceramic member such as alumina. Note that it is preferable that the insulating member 1 has the thermal expansion ratio which is in proximity to members that form the air-tight vessel and the substrate 1011.

A current resulting from dividing the acceleration voltage Va applied to the face plate 1017 (directly, the metal back 1019) at a higher potential side by the resistance Rs of the higher resistant film 11 that is a charge preventing film is made to flow in the higher resistant film 11 composing the spacer 1020. Therefore, the resistance Rs of the spacer is set to a desired range from the viewpoints of the charge prevention and the power consumption. It is preferable that the surface resistance R/square is $10^{14}$ Ω or less from the viewpoint of the charge prevention. It is needless to say that, in order to obtain the sufficient charge preventing effect, it is preferable that the surface resistance is set to $10^{13}$ Ω or less. A lower limit of the surface resistance depends on the spacer shape and a voltage applied between the spacers, but it is preferable that the lower limit of the surface resistance is $10^{7}$ Ω or more.

It is desirable that the thickness t of the charge prevention film formed on the insulating material is set to a range of 10 nm to 1 μm. Although depending on the surface energy of the material, the adhesion to the substrate and the substrate temperature, generally, the thin film with a thickness of 10 nm or less is poor in reproducibility because the thin film is formed in the form of islands and the resistance is unstable. On the other hand, if the film thickness t is 1 μm or more, a film stress becomes large so that the risk that the film is peeled off is increased, and a film formation time becomes longer, with the result that the productivity is low. Therefore, it is desirable that the film thickness is set to 50 to 500 nm. Because the surface resistance R/square is ρ/t, and based on the preferable ranges of R square and t are described above, it is preferable that the specific resistance p of the charge prevention film is set to 10 Ωcm to $10^{10}$ Ωcm. In addition, in order to realize the more preferable ranges of the surface resistance and the film thickness, it is better to set ρ to $10^4$ to $10^8$ Ωcm.

The temperature of the spacer is elevated by allowing a current to flow on the charge prevention film formed on the spacer, or heating the entire display during the operation as described above. If the resistance temperature coefficient of the charge prevention film is a large negative value, the resistance is decreased when the temperature rises, and the current that flows in the spacer increases, and the temperature further rises. Then, the current continues to increase until it exceeds the limit of the power source. The conditions in which the above current runaway occurs are characterized by a value of the temperature coefficient of resistance TCR that will be described by the following general expression ξ.

In the expression, ΔT and ΔR are increases of the temperature T and the resistance R of the spacer that is in an actual drive state with respect to the room temperature.

$$TCR=\Delta R/\Delta t/R\times 100[\%/^\circ \text{C.}] \qquad \text{general expression } \xi.$$

The conditions in which the current runaway occurs are that the TCR is ~1[%/° C.] or less in the experience. That is, it is desirable that the resistance temperature coefficient of charge prevention film is larger than −1[%/° C.]. The higher resistant film 11 having the charge prevention characteristic can be made of, for example, metal oxide. In particular, oxide of chrome, nickel and copper is a preferred material among the metal oxide. It is presumed that the reason is that those oxide is relatively small in the secondary electron-emitting efficiency, and even in the case where the electrons emitted from the cold cathode device 1012 are hit against the spacer 1020, it is difficult to charge the spacer 1020. In addition to the above metal oxide, carbon is a preferred material because the secondary electron emitting efficiency is small. In particular, because amorphous carbon is high in resistance, the spacer resistance is readily controlled to a desired value.

As another material of the higher resistance film 11 having the charge prevention characteristic, the nitride consisting of aluminum and transition metal alloy is proper because the nitride can control the resistance over a wide range from an excellent conductor to an insulator by adjusting the composition of the transition metal. In addition, the above nitride is a stable material which is small in a variation in the resistance during a process of manufacturing a display device which will be described later, and is also a material whose resistance temperature coefficient is less than −1% and is readily available in a practical use. The transition metal element may be Ti, Cr, Ta or the like.

The alloy nitride film is formed on the insulating member 1 through a thin film forming means such as a spattering, a reactive sputtering in a nitrogen gas atmosphere, an electron beam vacuum evaporation, an ion plating, or an ion assist vacuum evaporation method. In this case, the nitrogen gas is replaced by oxygen gas though the metal oxide film can be manufactured through the same thin film formation method. The metal oxide film can be also formed through the CVD method or the alkoxide coating method. The carbon film is manufactured through the vacuum evaporation method, the sputtering method, the CVD method or the plasma CVD method, and more particularly, in the case of manufacturing amorphous carbon, hydrogen is allowed to be contained in an atmosphere during the film formation, or carbon hydride gas is used for the film formation gas.

In this embodiment, the film formation is conducted with a member formed of the insulating member 1 and the higher resistant film 11 as the spacer base substance to which the film forming process according to the present invention is applied. The film formed in this process is a lower resistant film, and is provided in order to make the spacer electrically readily connectable to an other electrode within the electron beam device (image-forming apparatus), or in order to make the potential distribution in the spacer be in a preferred state. The lower resistant film that constitutes the electrode 110 at the edge of the spacer 1020 is a film that is formed in the film forming process of the present invention, and is disposed in order to make the higher resistant film 11 electrically connectable to the face plate 1017 (directly, the metal back 1019) at the higher potential side and the substrate 1011 (the wirings 1013 and 1014) at the lower potential side. In the following description, the term "intermediate electrode layer (intermediate layer)" is also employed. The intermediate electrode layer (intermediate layer) has a plurality of functions stated below.

1) The higher resistant film 11 is electrically connected to the face plate 1017 and the substrate 1011.

As was already described, the higher resistant film 11 is disposed for the purpose of preventing the charge on the surface of the spacer 1020, and in the case where the higher resistant film 11 is connected to the face plate 1017 (metal back 1019) and the substrate 1011 (wirings 1013 and 1014) directly or through an abutment member 1041, a large contact resistance occurs on the connection portion interface, resulting in the fear that the electric charges that occur on the spacer surface cannot be rapidly removed. In order to prevent this drawback, a lower resistant intermediate layer is disposed on the abutment surfaces of the spacer 1020 which are in contact with the face plate 1017, the substrate 1011 and the abutment material 1041.

2) The potential distribution of the higher resistant film 11 is uniformed.

The electrons emitted from the cold cathode device 1012 form the electron frajectory in accordance with the potential distribution formed between the face plate 1017 and the substrate 1011. In order to prevent a disturbance from occurring in the electron trajectory in the vicinity of the spacer 1020, it is necessary to control the potential distribution of the higher resistant film 11 over the entire region. In the case where the higher resistant film 11 is connected to the face plate 1017 (metal back 1019) and the substrate 1011 (wirings 1013 and 1014) directly or through the abutment material 1041, the unevenness of the connecting state occurs because of the contact resistance of the connecting portion interface, resulting in the fear that the potential distribution of the higher resistant film 11 is shifted from a desired value. In order to prevent this drawback, a lower resistant intermediate layer is disposed over the overall length region of the spacer end portion (abutment surface) where the spacer 1020 is abutted against the face plate 1017 and the substrate 1011, and a desired potential is applied to the intermediate layer portion, thereby being capable of controlling the potential of the entire higher resistant film 11.

The lower resistant film may be selected from materials having a sufficiently lower resistance as compared with the higher resistant film 11, and is appropriately selected from metal of alloy such as Ni, Cr, Au. Mo, W, Pt, Ti, Al, Cu, Pb or the like, printing conductor made of metal or metal oxide such as Pd, Ag, Au, $RuO_2$ or Pd—Ag or the like and glass, and transparent conductor such as $In_2O_3$—$SnO_2$, and semiconductor material such as polysilicon.

Since it is necessary that the joint material 1041 has the electroconductivity so that the spacer 1020 is electrically connected to the row-directional wirings 1013 and the metal back 1019, flit glass to which an electroconductive adhesive, metal grains and electroconductive filler are added is preferable.

Note that, in this embodiment, the lower resistant film 110 is disposed outside of the higher resistant film 11, but the higher resistant film 11 may be disposed outside of the lower resistant film 110. Since the higher resistant film 11 is thin, the electric connection of the lower resistant film and the wiring or the acceleration electrode can be sufficiently conducted.

Also, in FIG. 7, Dx1 to Dxm and Dy1 to Dyn and Hv are electric connection terminals with an air tight structure disposed in order to electrically connect the display panel and an electric circuit (not shown). Dx1 to Dxm are electrically connected to the row-directional wirings 1013 of the multi electronic beam source. Dy1 to Dyn are electrically connected to the column-directional wirings 1014 of the multi electron beam source, and Hv is electrically connected to the metal back 1019 of the face plate.

Also, in order to exhaust the gas in the interior of the air-tight vessel into vacuum, after the air-tight vessel has been assembled, an exhaust tube and a vacuum pump (both not shown) are connected to each other, and the air is exhausted from the interior of the air-tight vessel to the degree of vacuum of about $10^{-7}$ Torr. Thereafter, the exhaust tube is sealed, and in order to maintain the vacuum degree within the airtight vessel, a gutter film (not shown) is formed at a given position within the air-tight vessel immediately before or after the sealing. The getter film is a film formed by heating a getter material due to heating by a heater or a high frequency heating, and then vapor evaporated. The interior of the air-tight vessel is maintained to the degree of vacuum of $1\times10^{-5}$ to $1\times10^{-7}$ Torr due to the adsorbing action of the getter film.

In the image display apparatus using the above-described display panel, when a voltage is applied to the respective cold cathode devices 1012 through the vessel external terminals Dx1 to Dxm, and Dy1 to Dyn, electrons are emitted from the respective cold cathode devices 1012. At the same time, a high voltage of several hundreds V to several kV is applied to the metal back 1019 through the vessel external terminal Hv, and the emitted electrons are accelerated and allowed to collide with the inner surface of the face plate 1017. As a result, the phosphors of respective colors which constitute the light emission film 1018 are excited and emit light, to thereby display an image.

Normally, the supply voltage to the surface conduction electron-emitting device 1012 of the present invention which is a cold cathode device is about 12 to 16 V, a distance d between the metal back 1019 and the cold cathode device 1012 is about 0.1 mm to 8 mm, and a voltage between the metal back 1019 and the cold cathode device 1012 is about 0.1 kV to 10 kV.

The above description was given of the basic structure and the manufacturing method of the display panel and the summary of the image display apparatus in accordance with the embodiment of the present invention.

(Method of Manufacturing a Multi Electron Source)

Subsequently, a description will be given of a method of manufacturing a multi electron beam source used for the display panel in accordance with the above-described embodiment. The multi electron beam source used in the image display apparatus in accordance with the present invention is not limited by the material, the shape and the manufacturing method of the cold cathode device if the cold cathode device is an electron source of the passive matrix arrangement. Accordingly, for example, the surface conduction electron-emitting device, the PE type or MIM type cold cathode device can be employed.

However, under the circumstances where a display device that has a large display screen and is inexpensive is demanded, the surface conduction electron-emitting device is particularly preferable among those cold cathode devices. In other words, in the FE type cold cathode device, because the electron-emitting characteristic largely depends on the relative position and the shape of an emitter cone and a gate electrode, an extremely high-precision manufacturing technique is required, which is disadvantageous in achieving a large area and a reduction in the manufacturing costs. Also, in the MIM type cold cathode device, it is necessary to thin the insulating layer and an upper electrode and uniform those layers, which are also disadvantageous in achieving a large area and a reduction in the manufacturing costs.

On the contrary, in the surface conduction electron-emitting device, it is easy to achieve the large area and a reduction in the manufacturing costs because the manufacturing method is relatively simple. Also, the present inventors have found that the structure in which the electron-emitting portion or its peripheral portion is formed of the micro-grain film is extremely excellent in the electron-emitting characteristic among the surface conduction electron-emitting device, and the manufacturing is readily conducted. Therefore, in using the multi electron beam source of the image display apparatus which is high in brightness and large in its screen size, the surface conduction electron-emitting device is most preferable. Therefore, in the display panel according to the above-mentioned embodiment, there is used the surface conduction electron-emitting device where the electron-emitting portion or its peripheral portion is formed of the micro-grain film. The basic structure, the manufacturing method and the characteristic of the preferred surface conduction electron-emitting device will be first described, and thereafter the structure of the multi electron beam source in which a large number of devices are arranged in a passive matrix wiring will be described.

1. The preferred device structure and manufacturing method of the surface conduction electron-emitting device:

The representative structures of the surface conduction electron-emitting device where the electron-emitting portion and its peripheral portion are formed of the micro-gain film are of two sorts consisting of the plane type and the step type.

(Plane Type Surface Conduction Electron-emitting Device)

First of all, a description will be given of the device structure and the manufacturing method of the plane type surface conduction electron-emitting device. The structure of the plane type surface conduction electron-emitting device is shown in FIGS. 9A and 9B in detail. In this example, reference numeral 1101 denotes a substrate; 1102 and 1103 denote device electrodes; 1104 denotes an electroconductive thin film; 1105 denotes an electron-emitting portion formed through an energization forming operation; and 1113 denotes a thin film formed through an energization activation operation.

The substrate 1101 may be, for example, various glass substrates such as quartz glass or soda lime glass, various ceramics substrates such as alumina or a substrate where an insulating layer made of, for example, $SiO_2$ is laminated on the above-described respective substrates.

Also, the device electrodes 1102 and 1103 disposed on the substrate 1101 so as to face the substrate surface in parallel are made of a material having electroconductivity. For example, the device electrodes 1102 and 1103 may be appropriately selected from, for example, metal such as Ni, Cr, Au, Mo, W. Pt, Ti, Cu, Pd and Ag, alloy of those metals, metal oxide such as $In_2O_3$—$SnO_2$, and semiconductor such as polysilicon. The electrode may be readily formed if the film manufacturing technique such as vacuum evaporation and the patterning technique such as photolithography or etching are employed in combination, but other methods (for example, printing technique) may be used to form the electrode.

The shapes of the device electrodes 1102 and 1103 are appropriately designed in correspondence with the applied purpose of the electron-emitting device. In general, an electrode interval L is normally designed by selecting an appropriate value from a range of several hundreds Å to several hundreds micrometers. The range preferable for applying the device electrodes 1102 and 1103 to the display apparatus in the above range are the range of several micrometers to several tens micrometers. Also, the thickness d of the device electrode is normally selected from an appropriate numerical value of a range of several hundreds Å to several micrometer.

Also, the portion of the electroconductive thin film 1104 is formed of the micro-grain film. The micro-grain film described herein is directed to a film containing a large number of micro-grains (also including an island-like assembly) as the structural elements. If the micro-grain film is micro-visually investigated, a structure in which the respective micro-grains are disposed apart from each other, a structure in which the micro-grains are adjacent to each other, or a structure in which the micro-grains are superimposed on each other is normally observed.

The diameter of the micro-grains used for the micro-grain film is in a range of several hundreds Å to several thousands Å, and more preferably in a range of 10 Å to 200 Å. Also, the thickness of the micro-grain film is appropriately set taking various conditions that will be described later into consideration. That is, the various conditions include a condition required to excellently electrically connect the device electrode 1102 or 1103 to the micro-grain film, a condition required to excellently conduct the energization forming that will be described later, a condition required to set the electric resistance of the micro-grain film to an appropriate value which will be described later, and the like. Specifically, the thickness of the micro-grain film is set to a range of several Å to several thousands Å, and more preferably a range of 10 Å to 500 Å.

Also, a material used for forming the micro-grain film is appropriately selected from, for example, metal including Pd. Pt. Ru, Ag, Au, Ti, In, Cu, Cr, Fe, Zn, San, Ta, W, Pb and the like, oxide including PdO. $SnO_2$, $In_2O_3$, Po, $Sc_2O_3$ and the like, boron including $HfB_2$, $ZrB_2$, $LaB_6$, $CeB_6$, $YB_4$, $GdB_4$ and the like, carbide including TiC, ZrC, HfC, TaC, SiC, WC and the like, nitride including TiN, ZrN, HfN and the like, semiconductor including Si, Ge and the like, carbon, and the like.

As described above, the electroconductive thin film 1104 is formed with the micro-grain film and its sheet resistance is set to be in a range of $10^3$ to $10^7$ Ω/sq.

Note that, because it is desirable that the electroconductive thin film 1104 and the device electrodes 1102 and 1103 are electrically excellently connected to each other, a structure in which portions of those members overlap with each other is employed. The overlapping manner is that the substrate, the device electrode and the electroconductive thin film are laminated in the stated order from the lower side in the example of FIGS. 9A and 9B, but the substrate, the electroconductive thin film and the device electrode may be laminated in the stated order from the lower side depending on the situation.

Also, the electron-emitting portion 1105 is a fissure portion formed on a part of the electroconductive thin film 1104, and has an electrically higher resistant property than that of the surrounding electroconductive thin film. The fissure is formed by conducting the energization forming that will be described later on the electroconductive thin film 1104. There is a case in which the micro-grains of several Å to several hundreds Å in diameter are disposed within the fissure. Note that, since it is difficult to show the position and shape of the actual electron-emitting portion with precision and accuracy, the electron-emitting portion is schematically shown in FIGS. 9A and 9B.

Also, the thin film 1113 is a thin film made of carbon or carbon compound and coats the electron-emitting portion 1105 and a portion close to the electron-emitting portion 1105. The thin film 1113 is formed by conducting an energization activation operation that will be described later after the energization forming operation has been conducted.

The thin film 1113 is made of any one or mixture of monocrystal graphite, multi-crystal graphite and amorphous carbon, and its thickness is set to 500 Å or less, and more preferably 300 Å or less. Since it is difficult to show the position and shape of the actual thin film 1113 with precision, the thin film 1113 is schematically shown in FIGS. 9A and 9B. Also, a plan view of FIG. 9A shows a device from which a part of the thin film 1113 has been removed.

The above description is given of the basic structure of the preferred device, but the following device is used in fact. That is, the substrate 1101 is made of soda lime glass, and the device electrodes 1102 and 1103 are formed of an Ni thin film. The thickness d of the device electrode is set to 1000 Å, and the electrode interval L is set to 2 micrometers. Also, the main material of the micro-grain film is Pd or PdO, and the thickness of the micro-grain film is set to about 100 Å and the width W thereof is set to 100 micrometers.

Subsequently, a method of manufacturing the plane type surface conduction electron-emitting device will be described with reference to FIGS. 13A to 13D. FIGS. 13A to 13D are cross-sectional views for explaining a process of manufacturing the surface conduction electron-emitting device, and the respective members are denoted by identical reference numerals of FIGS. 9A and 9B.

Figure 13A:
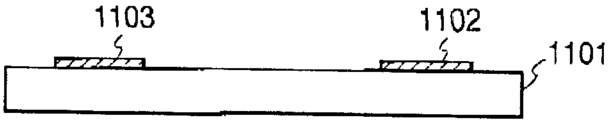
FIGS. 13A, 13B, 13C, 13D and 13E are cross-sectional views showing a process of manufacturing a plane type surface conduction electron-emitting device in accordance with the present invention.

1) First, as shown in FIG. 13A, the device electrodes 1102 and 1103 are formed on the substrate 1101. In formation of those device electrodes 1102 and 1103, after the substrate 1101 has been sufficiently washed with cleaner, pure water and organic solvent, the material of the device electrode is deposited on the substrate 1101 (as the depositing method, for example, a vacuum film forming technique such as the vacuum evaporation method or the sputter method may be used). Thereafter, the deposited electrode material is patterned through the photolithography etching technique to form the above-mentioned device electrodes 1102 and 1103.

Figure 13B:
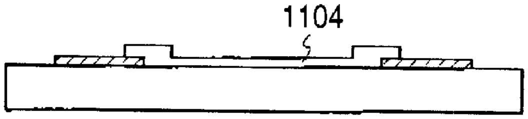

2) Subsequently, as shown in FIG. 13B, the electroconductive thin film 1104 is formed. In forming this film, after an organic metal solution is coated on the substrate shown in FIG. 13A, dried and baked by heating to form the micro-grain film, the micro-grain film is patterned into a given shape by the photolithography etching. In this example, the organic metal solution is a solution of the organic metal compound that contains the material of the micro-grains as the main element used in the electroconduotive thin film (in this example, as a specific example. Pd is used as the main element, and a dipping method is employed as the coating method, but other methods, for example, the spinner method or the spray method may be used).

Also, as the method of forming the electroconductive thin film made of the micro-grain film, there is a case in which another method except for the method of coating the organic metal solution used herein, for example, such as the vacuum evaporation method, the sputter method or the chemical gas-phase deposition method may be used.

Figure 13C:
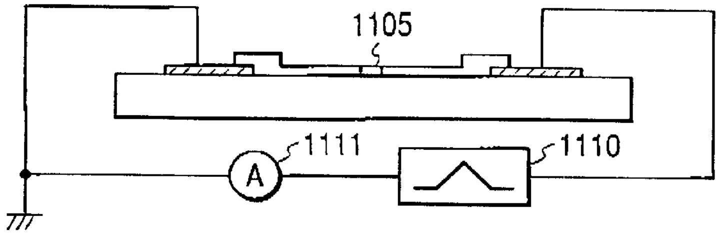

3) Subsequently, as shown in FIG. 13C, an appropriate voltage is applied between the device electrodes 1102 and 1103 from the forming power source 1110 to conduct the energization forming operation, thereby forming the electron-emitting portion 1105. The energization forming operation is directed to a process in which the electroconductive thin film 1104 formed of the micro-grain film is energized to appropriately destroy, deform or deteriorate a part of the electroconductive thin film 1104 into a structure suitable for emitting the electrons. In a portion that has been changed into the structure suitable for emitting the electrons (electron-emitting portion 1105) among the electroconductive thin film formed of the micro-grain film, an appropriate fissure is formed. The electric resistance measured between the device electrodes 1102 and 1103 greatly increases after the electron-emitting portion 1105 has been formed as compared with that before the electron-emitting portion 1105 is formed.

Figure 14:
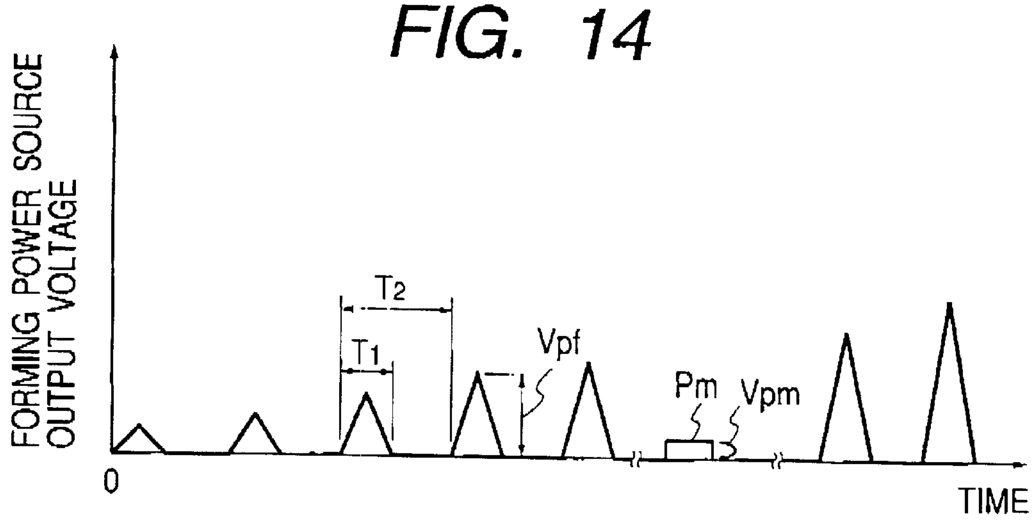
FIG. 14 is a graph showing a supply voltage waveform when an energization process is conducted.

For explanation of the energizing method in more detail, FIG. 14 shows an example of an appropriate voltage waveform that is applied from the forming power source 1110. In the case where the electroconductive thin film formed of the micro-grain film is formed, a pulsed voltage is preferred, and in this example, as shown in FIG. 14, a chopping pulse of a pulse width Ti is continuously applied at pulse intervals T2. In this situation, the peak value Vpf of the chopping pulse is sequentially boosted. Also, monitor pulses Pm for monitoring the forming state of the electron-emitting portion 1105 are inserted between the chopping pulses at appropriate intervals, and a current that flows in that situation is measured with an ammeter 1111.

In this example, for example, the pulse width T1 is set to 1 msec, the pulse interval T2 is set to 10 msec and the peak value Vpf is boosted by 0.1 V every 1 pulse under the vacuum atmosphere of about $10^{-5}$ Torr. The monitor pulse Pm is inserted once every time five pulses of chopping waves are applied, The voltage Vpm of the monitor pulse is set to 0.1 V so that the forming operation is not adversely affected. Then, at a state where the electric resistance between the device electrodes 1102 and 1103 becomes $1\times10^{6}$ Ω, that is, at a stage where a current measured with the ammeter 1111 at the time of applying the monitor pulse becomes $1\times10^{-7}$ A or less, the energization for the forming operation has been completed.

The above method is a method suitable for the surface conduction electron-emitting device in this example, and in the case where the design of the surface conduction electron-emitting device such as the material or thickness of the micro-grain film or the device electrode interval L is changed, it is desirable to appropriately change the conditions of energization in accordance with the change in the design.

Figure 13D:
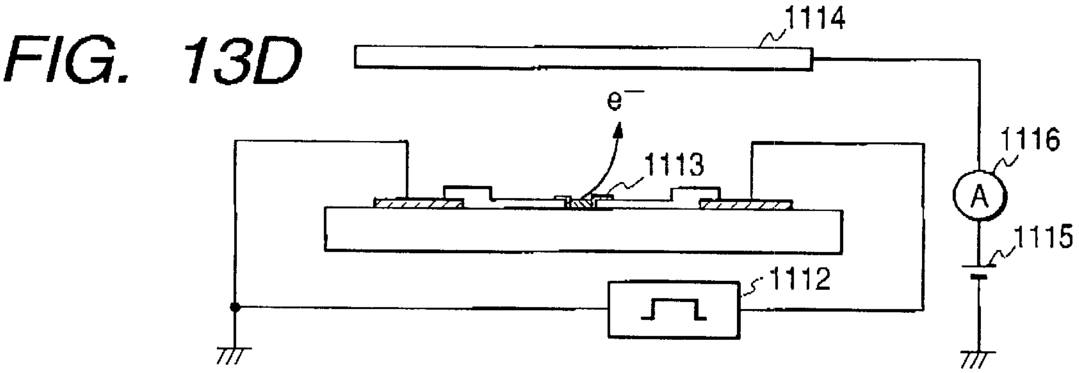

4) Subsequently, as shown in FIG. 13D, an appropriate voltage is applied between the device electrodes 1102 and 1103 from the activation power source 1112 to conduct the energization activation operation, to thereby improve the electron-emitting characteristic. In this example, the energization activation operation is directed to a process where the electron-emitting portion 1105 formed through the energization forming operation is energized under an appropriate condition, and carbon or carbon compound are deposited in the vicinity of the electron-emitting portion 1105 (in the figure, a deposit made of carbon or carbon compound is schematically shown as a member 1113). The emission current at the same supply voltage after the energization activation operation has been conducted can be increased by typically 100 times or more as compared with that before the energization activation operation is conducted.

More specifically, a voltage pulse is periodically supplied under a vapor atmosphere of $10^{-4}$ to $10^{-5}$ Torr, to thereby deposit carbon or carbon compound with an organic compound that exists in the vacuum atmosphere as an origin. The deposit 1113 is any one of monocrystal graphite, multicrystal graphite, amorphous carbon, or the mixture of those materials, and the film thickness is 500 Å or less, more preferably 300 Å or less.

Figure 15A:
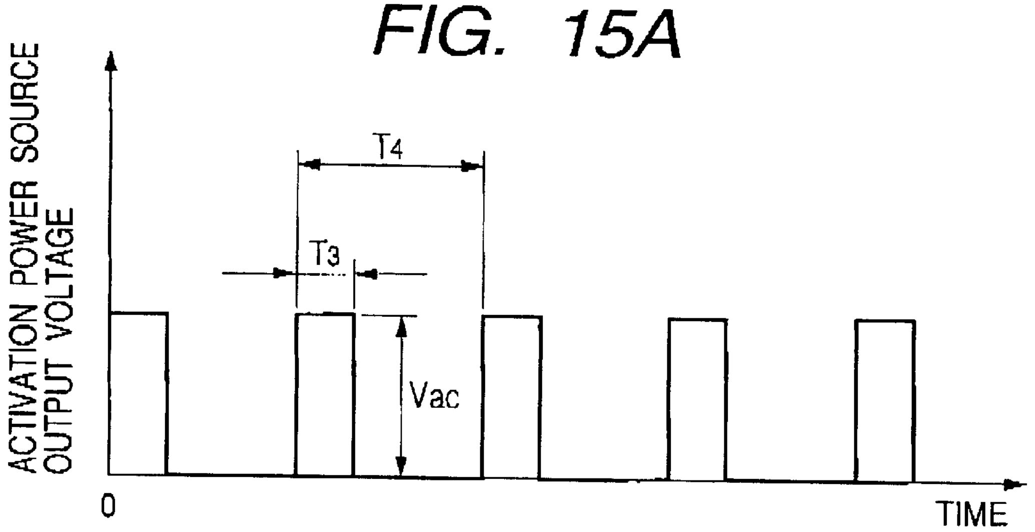
FIGS. 15A and 15B are graphs showing a supply voltage waveform when an energization activating processing is conducted, and a change in an emitted current Ie, respectively.

For describing the energization method in more detail, FIG. 15A shows an example of an appropriate voltage waveform that is applied from the activation power source 1112. In this example, a rectangular wave of a constant voltage is periodically applied to conduct the energization activation operation. More particularly, the voltage Vac of the rectangular wave is set to 14 V, the pulse width T3 is set to 1 msec, the pulse width T4 is set to 10 msec. The above-mentioned energization conditions are conditions suitable for the surface conduction electron-emitting element in this example, and in the case where the design of the surface conduction electron-emitting device is altered, it is desirable that the conditions are appropriately changed in accordance with the change of the design.

Reference numeral 1114 shown in FIG. 13D denotes an anode electrode for complementing the emission current Ie emitted from the surface conduction electron-emitting device, which is connected with a D.C. high voltage power source 1115 and an ammeter 1116 (note that, in the case where the activation operation is conducted after the substrate 1101 is assembled into a display panel, the light emission surface of the display panel is used as an anode electrode 1114). The emission current Ie is measured by the ammeter 1116 while a voltage is applied from the activation power source 1112 to monitor the advancing state of the energization activation operation, to thereby control the operation of the activation power source 1112.

Figure 15B:
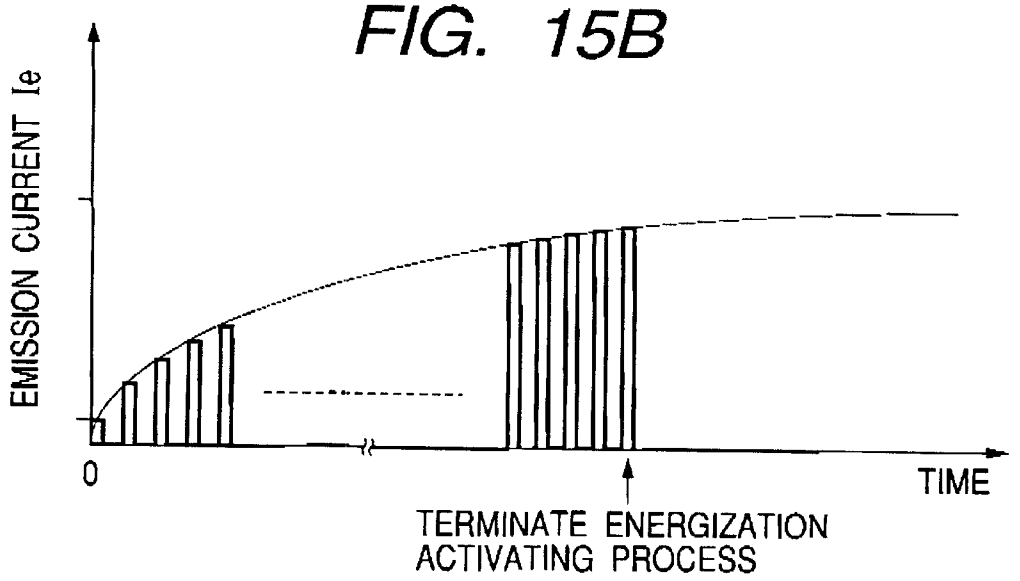

An example of the emission current Ie measured by the ammeter 1116 is shown in FIG. 15B. In this example, a pulse voltage is started to be applied from the activation power source 1112, the emission current Ie increases with passage of time. Thereafter, the emission current Ie is saturated and hardly increases. In this way, at the time where the emission current Ie is substantially saturated, the supply of the voltage from the activation power source 1112 stops to complete the energization activation operation.

Note that the above-mentioned energization conditions are conditions suitable for the surface conduction electron-emitting device in this example, and in the case where the design of the surface conduction electron-emitting device is altered, it is desirable that the conditions are appropriately changed in accordance with the change of the design.

Figure 13E:
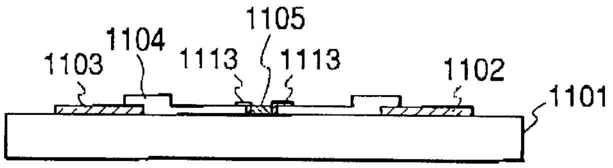

As described above, the plane type surface conduction electron-emitting device as shown in FIG. 13E can be manufactured.

(Step Type Surface Conduction Electron-emitting Device)

Subsequently, a description will be given of another representative structure of the surface conduction electron-emitting device where the electron-emitting portion or its periphery is formed of the micro-grain film, that is, the structure of the step type surface conduction electron-emitting device.

Figure 16:
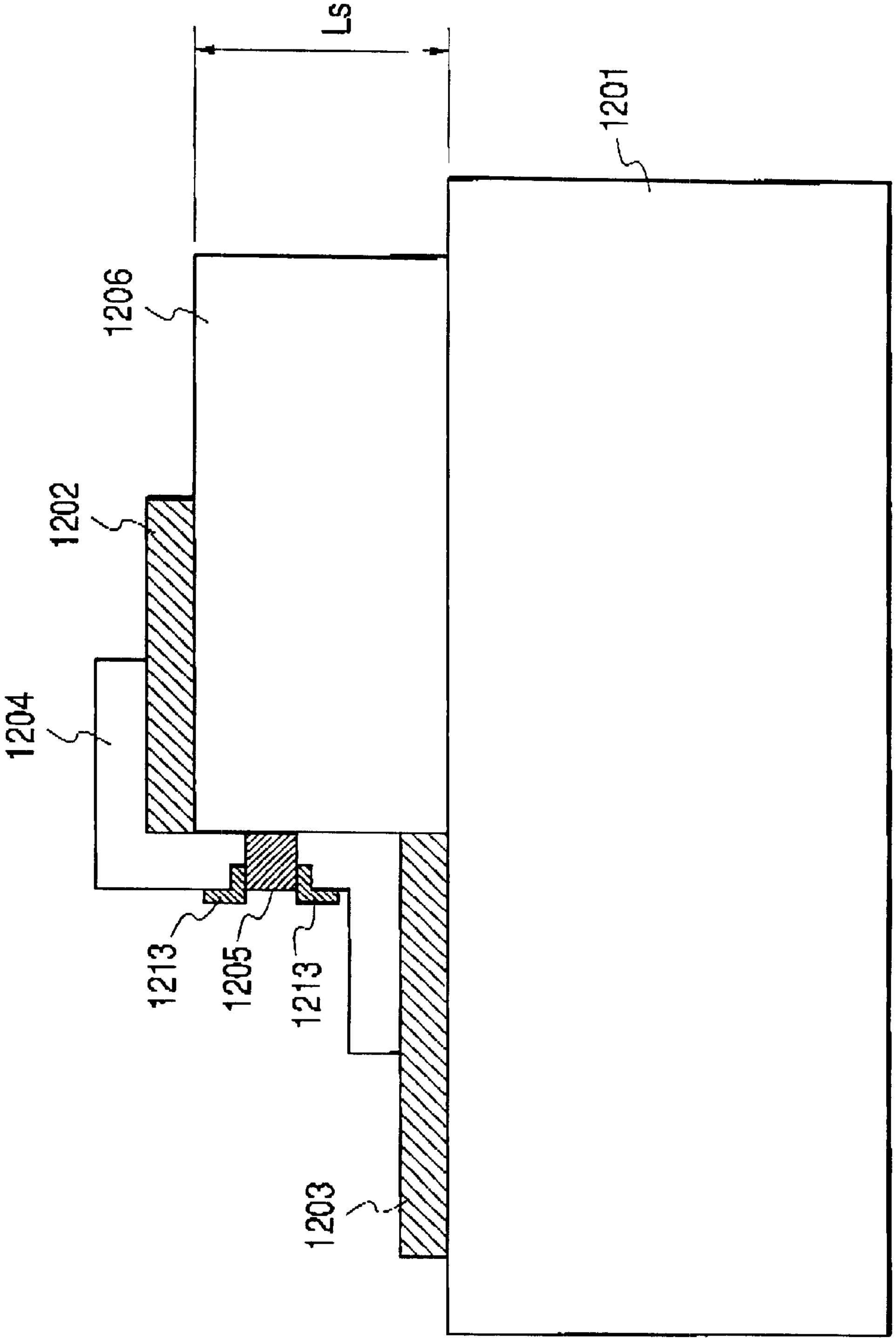
FIG. 16 is a cross-sectional view showing a process of manufacturing a vertical type surface conduction electron-emitting device in accordance with the present invention.

FIG. 16 is a cross-sectional view for explaining the basic structure of the step type surface conduction electron-emitting device, and in the figure, reference numeral 1201 denotes a substrate; 1202 and 1203 denote device electrodes; 1206 denotes a step forming member; 1204 denotes an electroconductive thin film formed of the micro-grain film; 1205 denotes an electron-emitting portion formed through the energization forming operation; and 1213 denotes a thin film formed through the energization activation operation.

A difference of the step type surface conduction electron-emitting device from the plane type surface conduction electron-emitting device that is described above resides in that one of the device electrodes (device electrode 1202) is disposed on the step forming member 1206, and the electroconductive thin film 1204 coats the side surface of the step forming member 1206. Therefore, what corresponds to the device electrode interval L in the plane type surface conduction electron-emitting device shown in FIGS. 9A and 9B is a step height Ls of the step forming member 1206 in the step type surface conduction electron-emitting device. The same materials as those recited in the description of the plans type surface conduction electron-emitting device can be employed for the substrate 1201, the device electrodes 1202 and 1203 and the electroconductive thin film 1204 formed of the micro-grain film. Also, the step forming member 1206 may be made of, for example, an electrically insulating material such as $SiO_2$.

Subsequently, a description will be given of a method of manufacturing the step type surface conduction electron-emitting device. FIGS. 17A to 17F are cross-sectional views for explaining the manufacturing process, and the respective members are denoted by the same reference numerals as those in FIG. 16.

Figure 17A:
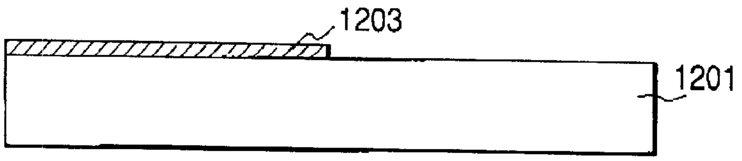
FIGS. 17A, 17B, 17C, 17D, 17E and 17F are cross-sectional views showing a process of manufacturing a vertical type surface conduction electron-emitting device.

1) First, as shown in FIG. 17A, the device electrode 1203 is formed on the substrate 1201.

Figure 17B:
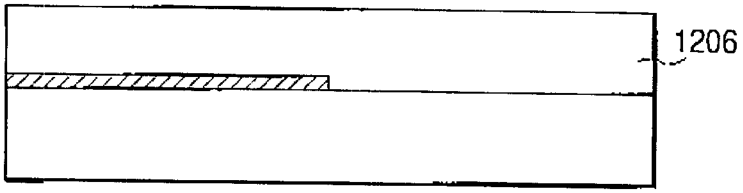

2) Then, as shown in FIG. 17B, an insulating layer for forming the step forming member is laminated. The insulating layer is formed by, for example, laminating $SiO_2$ through the sputter method, but another film forming method such as the vacuum evaporation method or the printing method may be employed.

Figure 17C:
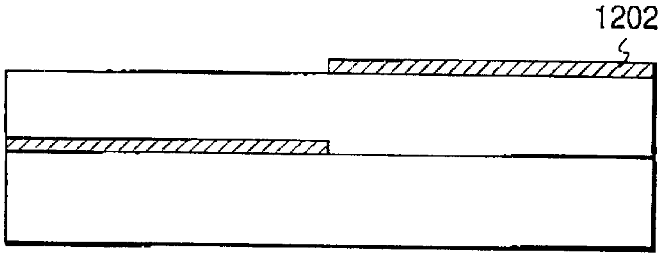

3) Then, as shown in FIG. 17C, the device electrode 1202 is formed on the insulating layer.

Figure 17D:
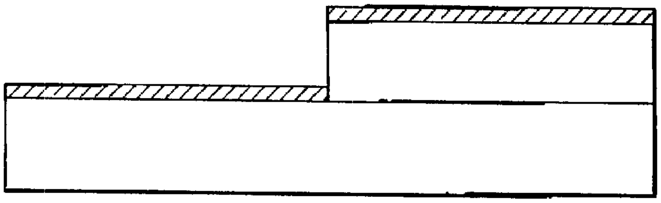

4) Then, as shown in FIG. 17D, a part of insulating layer is removed, for example, through the etching method to expose the device electrode 1203.

Figure 17E:
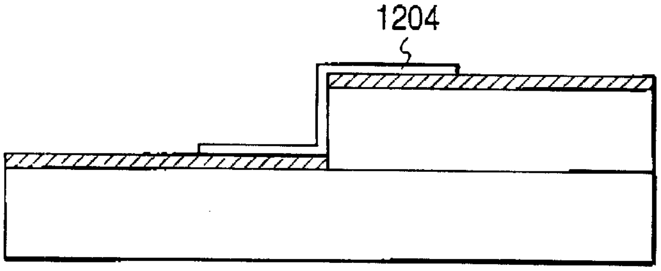

5) Then, as shown in FIG. 17E, the electroconductive thin film 1204 formed of the micro-grain film is formed. In order to form the electroconductive film 1204, for example, the film forming technique such as the coating method may be employed as in the plane type surface conduction electron-emitting device.

6) Then, the energization forming operation is conducted to form the electron-emitting portion as in the plane type surface conduction electron-emitting device (the same process as the energization forming operation of the plane type surface conduction electron-emitting device as described with reference to FIG. 13C may be conducted).

7) Subsequently, the energization activation operation is conducted to deposit carbon or carbon compound in the vicinity of the electron-emitting portion as in the plane type surface conduction electron-emitting device (the same process as the energization activation operation of the plane type surface conduction electron-emitting device as described with reference to FIG. 13D may be conducted).

Figure 17F:
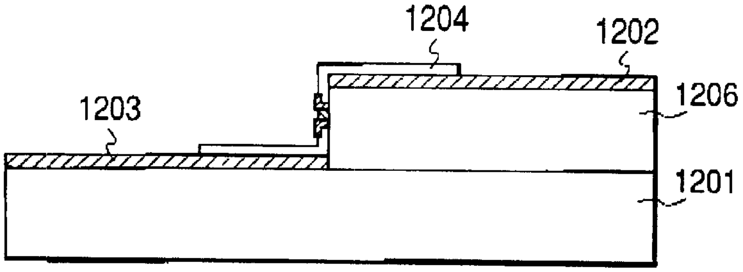

As described above, the step type surface conduction electron-emitting device shown in FIG. 17F can be manufactured.

(Characteristics of the Surface Conduction Electron-emitting Device Used in the Display Apparatus)

Figure 18:
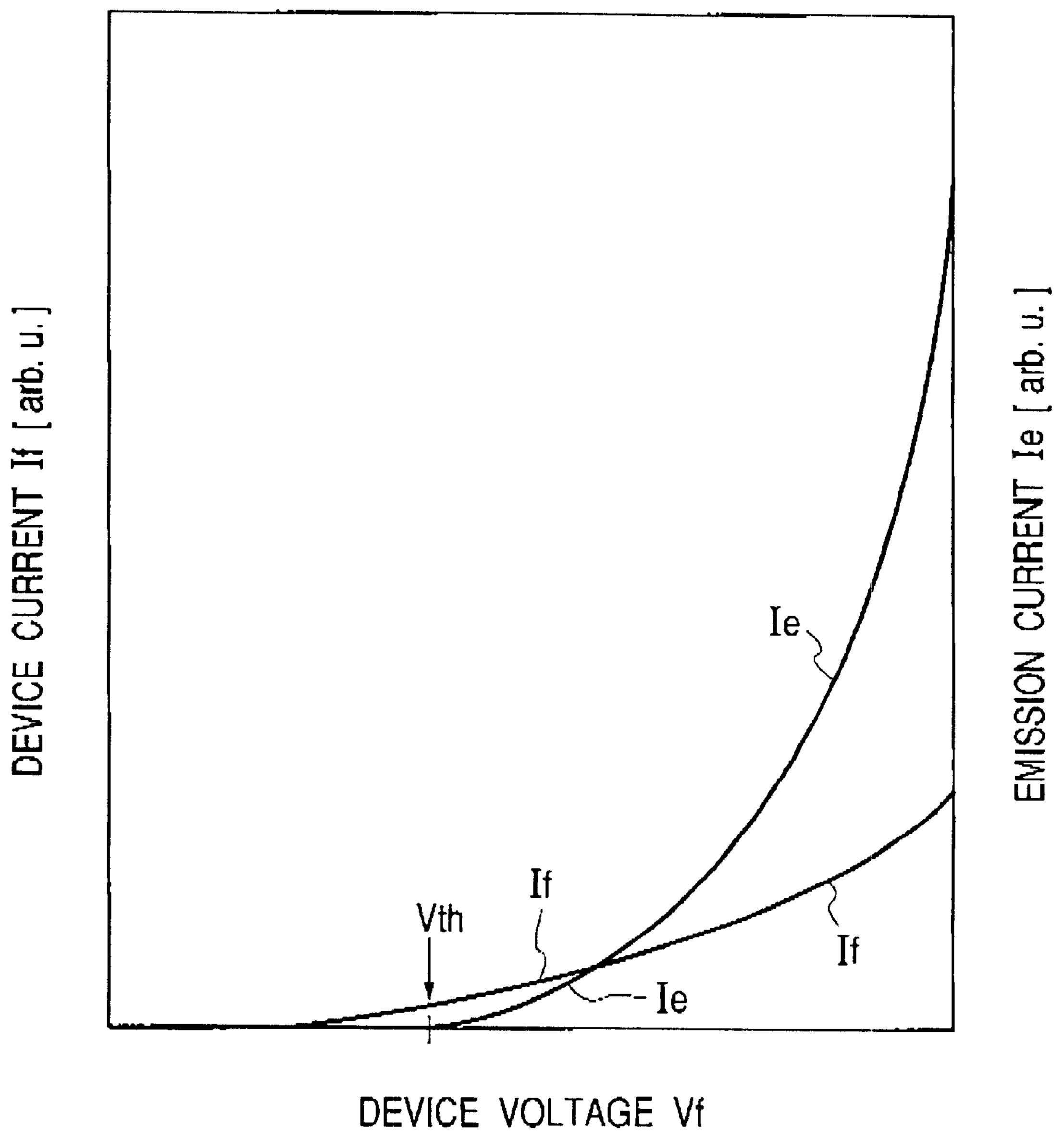
FIG. 18 is a graph showing a typical characteristic of the surface conduction electron-emitting device.

The above description is given of the device structures and the manufacturing methods of the plane type and the step type surface conduction electron-emitting devices, and the following description will be given of the characteristics of the device used in the display device. FIG. 18 shows a typical example of the discharge current Te to device supply voltage Vf characteristic, and the device current If to the device supply voltage Vf characteristic of the device used in the display device. Since the emission current Ie is remarkably small as compared with the device current If such that it is difficult to show those currents in the same measure, and those characteristics are changed by altering the design parameter such as the size or the shape of the device, two graphs are shown in arbitrary units, respectively. The device used in the display device has the following three characteristics with respect to the emission current Ie.

First, when a voltage equal to or larger than a certain voltage (which is called "threshold voltage Vth") is applied, the emission current Ie rapidly increases whereas when a voltage smaller than the threshold voltage Vth is applied, the emission current Ie is hardly detected. In other word, the device is a non-linear device having a distinct threshold voltage Vth with respect to the emission current Ie.

Second, because the emission current Ie changes depending on the voltage Vf that is applied to the device, the magnitude of the emission current Ie can be controlled by the voltage Vf.

Third, because a response speed of the current Ie emitted from the device is high with respect to the voltage Vf that is applied to the device, the amount of charges of electrons emitted from the device can be controlled in accordance with the length of a period of time during which the voltage Vf is being applied.

Since the above-described characteristics are provided, the surface conduction electron-emitting device can preferably used in the display device. For example, in the display device where a large number of devices are disposed on pixels of the display screen, if the first characteristic is utilized, it is possible that the display screen is sequentially scanned to conduct display. In other words, a voltage equal to or more than the threshold voltage Vth is appropriately applied to the device that is being driven in accordance with a desired light emission luminance, and a voltage less than the threshold voltage Vth is applied to the device that is in a non-selective state. Also, if the device that is driven is sequentially changed over, it is possible that the display screen is sequentially scanted to conduct display. Further, because the light emission luminance can be controlled by utilizing the second characteristic or the third characteristic, it is possible to conduct gradient display.

(Structure of the Multi Electron Beam Source Where a Large Number of Devices are Arranged in a Passive Matrix Wiring)

Figure 19:
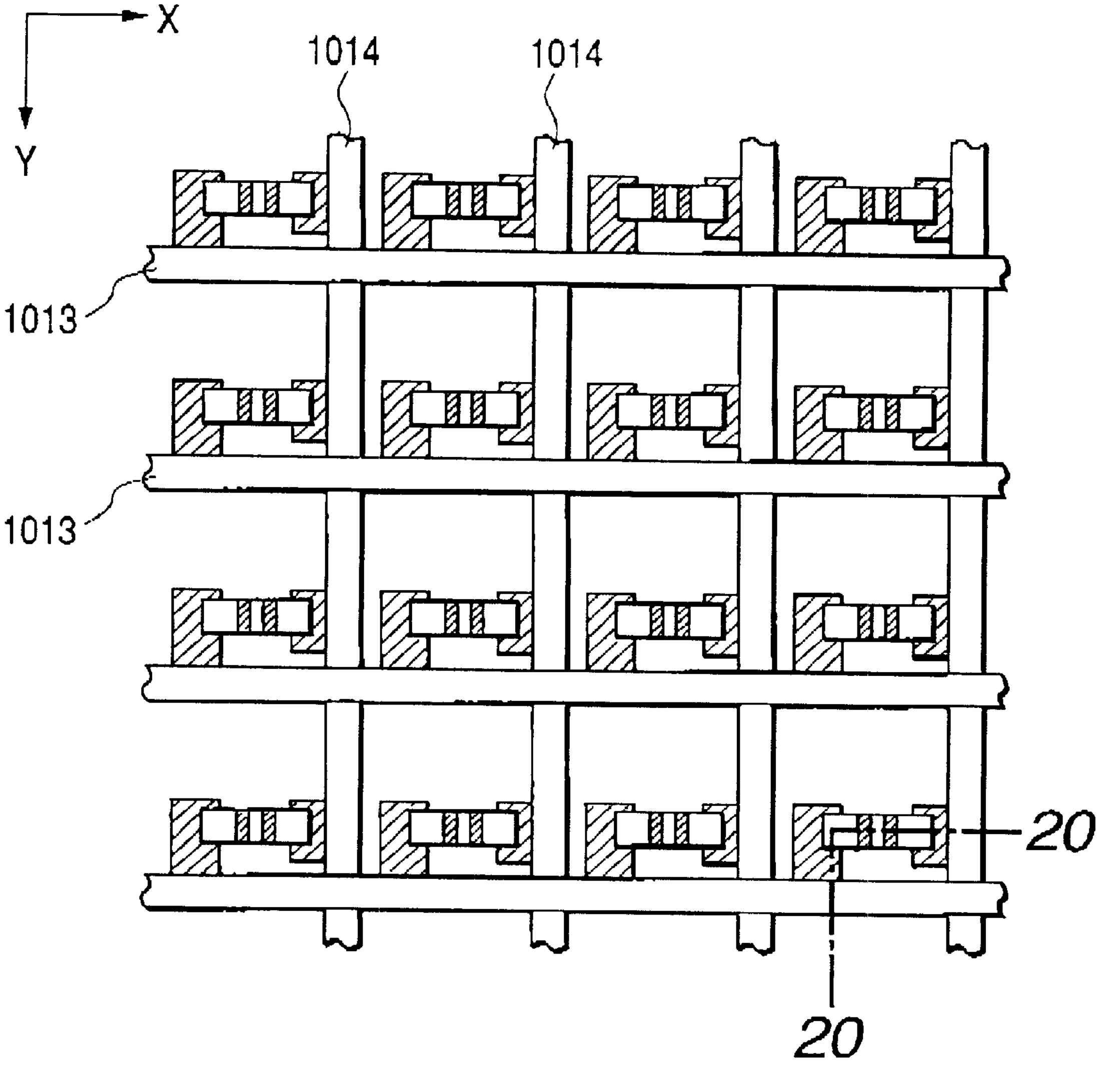
FIG. 19 is a plan view showing a surface conduction electron-emitting device used for the display panel shown in FIG. 7.

Subsequently, a description will be given of the structure of the multi electron beam source in which the above-mentioned surface conduction electron-emitting devices are arranged on the substrate in the passive matrix wiring. FIG. 19 is a plan view used in the display panel shown in FIG. 7. On the substrate the same surface conduction electron-emitting devices as those in FIGS. 9A and 9B are arranged, and those devices are arranged in the passive matrix by means of the row-directional wiring electrodes 1013 and the column-directional wiring electrodes 1014. An insulating layer (not shown) is formed on portions where the row-directional wiring electrodes 1013 and the column-directional wiring electrodes 1014 cross each other between the electrodes to keep the electric insulation.

Figure 20:
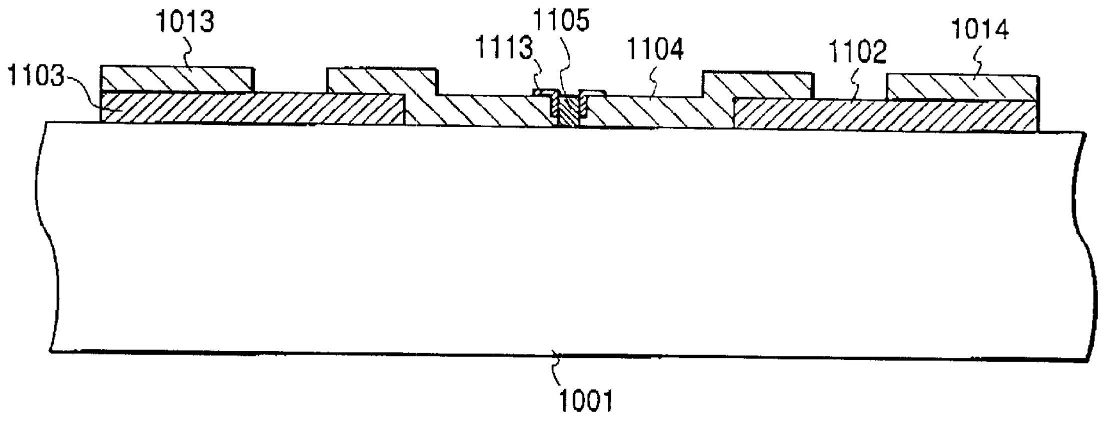
FIG. 20 is a cross-sectional view taken along a line 20—20 of FIG. 19.

A cross section along a line 20—20 of FIG. 19 is shown in FIG. 20. Note that the multi electron source thus structured can be manufactured in such a manner that after the row-directional wiring electrodes 1013, the column-directional wiring electrodes 1014, the inter-electrode insulating layers (not shown) and the device electrodes and the electroconductive thin films of the surface conduction electron-emitting devices have been formed on the substrate in advance, respectively, electricity is supplied to the respective devices through the row-directional wiring electrodes 1013 and the column-directional wiring electrodes 1014 to conduct the energization forming operation and the energization activation operation.

(Second Embodiment)

Figure 21:
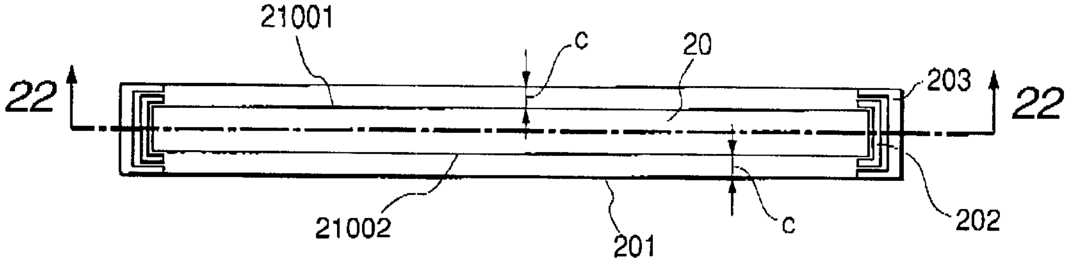
FIG. 21 is a top view showing a state in which a spacer and a spacer block are combined together in accordance with a second embodiment of the present invention.
Figure 22:
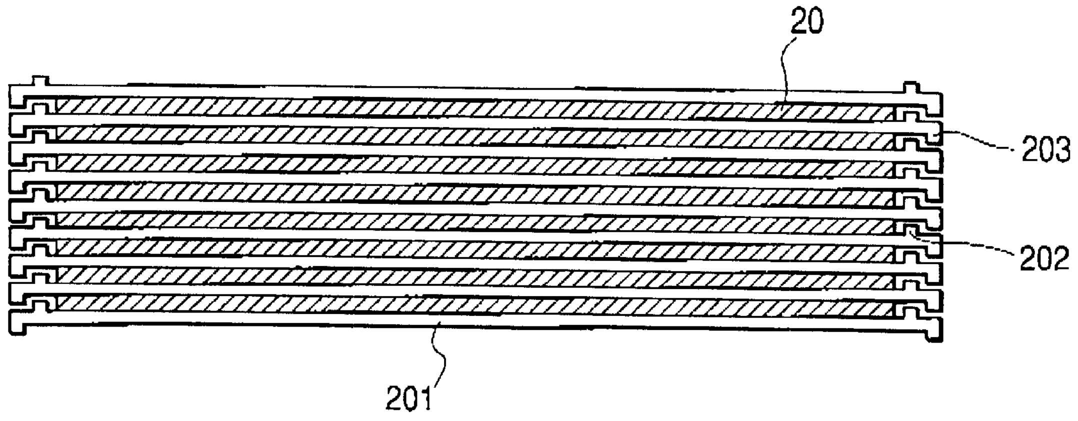
FIG. 22 is a cross-sectional view showing a spacer and a spacer block taken along a line 22—22 of FIG. 21.
Figure 23:
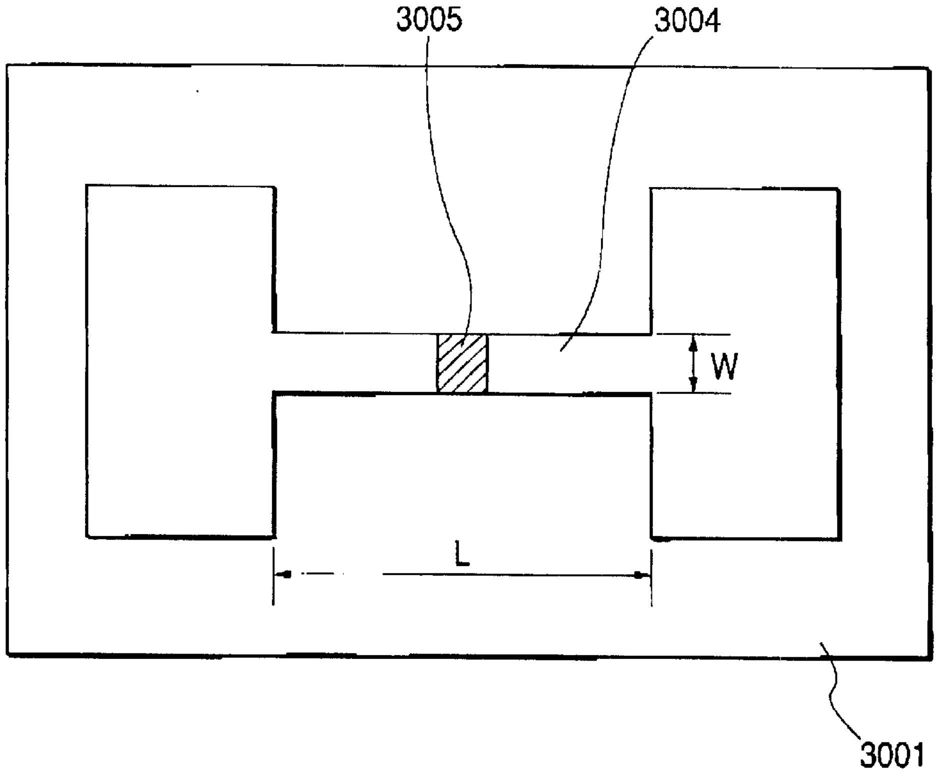
FIG. 23 is a cross-sectional view showing an example of a conventional surface conduction electron-emitting device.
Figure 24:
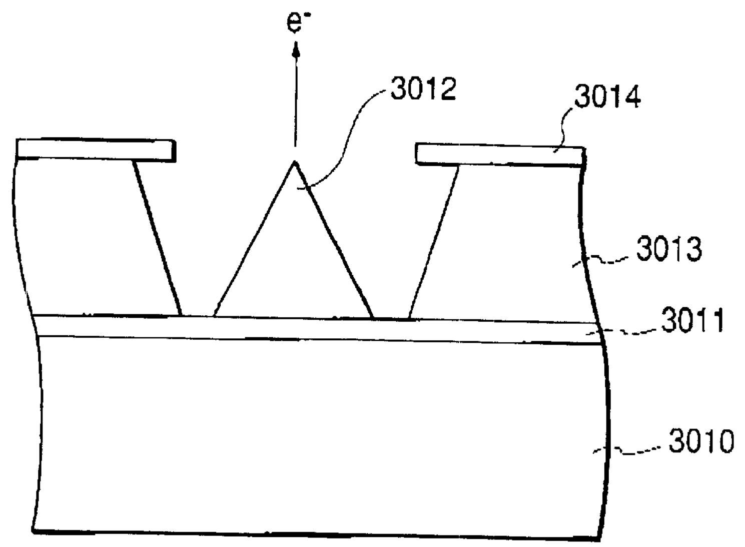
FIG. 24 is a cross-sectional view showing an example of a conventional FE type device.
Figure 25:
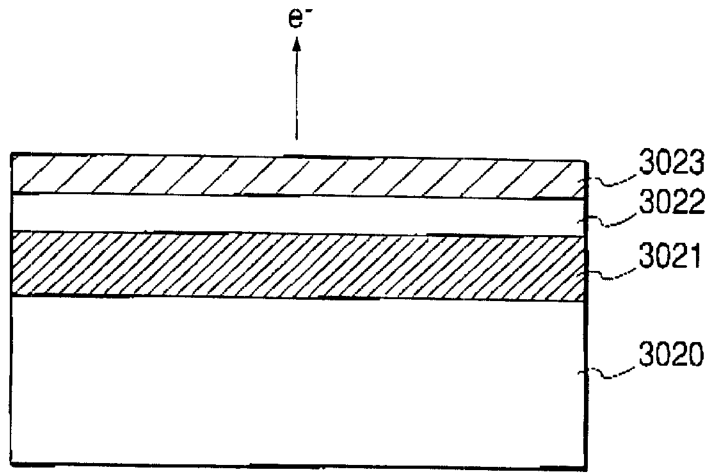
FIG. 25 is a cross-sectional view showing an example of a conventional MIM type device.
Figure 26:
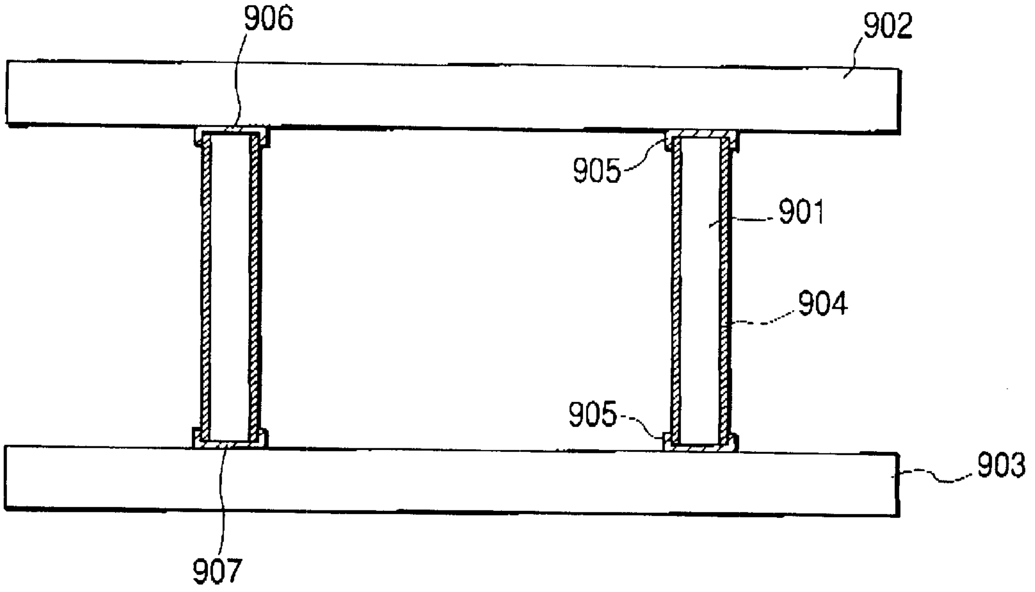
FIG. 26 is a cross-sectional view showing a conventional display panel.

FIGS. 21 and 22 are diagrams for explaining a second embodiment of the present invention, and FIG. 21 is a top view of a state in which a spacer 20 is set to a spacer block 201 where reference numeral 21001 denotes one (top end surface) of electrode formation surfaces of the spacer, and 21002 denotes another electrode formation surface (lower end surface) of the spacer. FIG. 22 is a cross-sectional view along a line 22—22 of FIG. 21. The feature of this embodiment resides in that the spacer 20 and the spacer block 201 is stacked on each other, and in that the spacer electrode is formed on the upper and lower edges 102 of both ends of the spacer at the same time. In this example, reference numeral 202 denotes a protrusion on an upper surface formed on both sides of the spacer block 201, and 203 denotes a protrusion on a lower surface thereof. Also, FIG. 22 shows a state in which a block is further arranged on the uppermost stage at the time of forming the electrode.

In this embodiment, the size of the spacer 20 is set to 350 mm×1.6 mm×0.3 mm, the outer size of the block 101 is set to 400 mm×2.8 mm×3 mm, and the heights of the upper and lower protrusions are set to 0.2 mm, respectively. The protrusion length c of the block end portion from the film formation surface of the spacer is set to 0.6 mm. Also, the spacer block 201 is formed by cutting a cuttable glass.

Also, in this example, spacer electrodes (A1 electrodes) are formed on the exposed upper and lower edges of the spacer 20 in a state where the spacer 20 is nipped between the above-mentioned spacer blocks 201 through the sputter method. That is, a plurality of spacers 20 are located in a sputter device (not shown) together with the spacer blocks 201 in a state as shown in FIG. 2 to conduct high-frequency sputtering in an argon atmosphere, thereby forming the A1 electrode with a thickness of 0.3 $\mu$m. Note that, in this example, the protrusions 202 and 203 function so that no electrode is formed on side surface portions on both sides of the spacer.

As a result of applying the spacer fabricated in this example to the same image display apparatus as that described in the first embodiment, a high-grade image formation is enabled.

(Other Embodiments)

Note that the present invention can be applied to any electron-emitting device among the cold cathode electron-emitting devices other than SCE. As a specific example, there is the electric field emission type electron-emitting device in which a pair of opposed electrodes are disposed along the substrate surface that forms the electron source as disclosed in Japanese Patent Application Laid-Open No. 63-274047 by the present applicant.

Also, the present invention can be applied even to an image-forming apparatus using an electron source other than a passive matrix type. For example, in an image-forming apparatus that selects SCE by using the control electrode as disclosed in Japanese Patent Application Laid-Open No. 2-257551, the above support member is used between the electron source and the control electrode.

Further, according to the technical concept of the present invention, the target of the present invention is not limited to an image-forming apparatus suitable for display, but can be spread even to the above-described image-forming apparatus as the light emitting source substituting for the light emitting diode of an optical printer made up of a photosensitive drum, a light emitting diode and the like. Further, in this situation, the above-mentioned m row directional wirings and n column directional wirings are appropriately selected, thereby being capable of applying the light emitting source as a two-dimensional light emitting source and not only as a linear light emitting source.

Still further, according to the technical concept of the present invention, in the case where a member to which electrons emitted from the electron source are irradiated is a member other than the image forming member, for example, as in an electronic microscope, the target to which the present invention is applied can be expanded. In other words, the present invention can be applied with an electron beam generating device that does not specify the member to be irradiated.

As was described above, in the spacer to which the present invention is applied, the spacer electrode can be fabricated with a high formation precision, and the disturbance of the electron trajectory is prevented, to thereby enable high-grade image formation.

As was described above, according to the present invention, a preferred spacer can be realized.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of manufacturing a spacer used in an electron beam generating device, comprising the steps of:

providing a material for forming a film on a film formation surface of a spacer base substance in a state where said spacer base substance is nipped; wherein said material is provided in a state where said film formation surface is not projected from an end portion of a nipping member for nipping said spacer base substance.

2. A method of manufacturing a spacer according to claim 1, wherein a film formed in said material providing step is an electrode.

3. A method of manufacturing a spacer according to claim 1, wherein said plurality of spacer base substances are held in a state where said nipping member is disposed between the respective spacer base substances to achieve said material providing step.

4. A method of manufacturing a spacer according to claim 1, wherein an end portion of said nipping member is projected from said film formation surface in said material providing step, and a corner portion of the projected end portion is rounded.

5. A method of manufacturing a spacer according to claim 1, wherein an end portion of said nipping member is projected from said film formation surface in said material providing step, and an opening portion defined by said pair of nipping members that nips said spacer base substance has a portion whose opening width in the nipping direction is gradually widened toward the exterior of said opening from said film formation surface.

6. A method of manufacturing a spacer according to claim 1, wherein said spacer has electroconductivity and is electrically connected to two different electrodes, and potentials different from each other are given to said two different electrodes.

7. A method of manufacturing a spacer according to claim 1, wherein said spacer base substance is formed of an insulating base substance, and said spacer includes said film formed in said material providing step and an electroconductive film other than said film.

8. A method of manufacturing a spacer according to claim 1, wherein said nipping member has such a shape as to project the end portion of said nipping member from said film formation surface by 5 $\mu$m or more when said material is provided.

9. An electron beam generating device, comprising:

an electron-emitting device; and a spacer manufactured in said manufacturing method as claimed in claim 1.

10. An image-forming apparatus, comprising:

an electron-emitting device; an acceleration electrode that accelerates electrons emitted from said electron-emitting device;

a phosphor that emits a light when electrons emitted from said electron-emitting device are irradiated to said phosphor; and a spacer manufactured in said manufacturing method as claimed in claim 1.

11. A method of manufacturing a spacer according to claim 1, wherein said electron beam generating device includes a first plate on which electron-emitting devices are disposed; and a second plate on which an acceleration electrode that is applied with an acceleration potential that accelerates electrons emitted from said electron-emitting devices is disposed.

12. A method of manufacturing a spacer according to claim 11, wherein said film formation surface comprises a surface that faces said first plate or said second plate when said electron beam generating device is structured.

13. A method of manufacturing a spacer according to claim 1, wherein a length of the end portion of said nipping member protruded from said film formation surface is 10 mm or less.

14. A method of manufacturing a spacer according to claim 13, wherein said material providing step is achieved by a sputtering method, and a length of the end portion of said nipping member protruded from said film formation surface is 10 mm or less.

15. A method of manufacturing a spacer according to claim 13, wherein said material providing step is achieved by an electron beam vacuum evaporation method, and a length of the end portion of said nipping member protruded from said film formation surface is 8 mm or less.

* * * * *

UNITED STATES PATENT AND TRADEMARK OFFICE

CERTIFICATE OF CORRECTION

PATENT NO. : 6,656,007 B2 
DATED : December 2, 2003
INVENTOR(S) : Masahiro Fushimi et al.

It is certified that error appears in the above-identified patent and that said Letters Patent is hereby corrected as shown below:

Column 9,
Line 67, “103: and” should read -- 103; and --.

Column 11,
Line 26, “Input” should read -- input --.

Column 14,
Line 28, “Inner” should read -- inner --.

Column 16,
Line 60, “Au.” should read -- An, --.

Column 17,
Line 27, “airtight” should read -- air-tight --.

Column 19,
Line 2, “W.” should read -- W, --;
Line 49, “Pd. Pt.” should read -- Pd, Pt, --; and
Line 50, “PdO.” should read -- PdO, --.

Column 21,
Line 31, “width Ti” should read -- width T1 --.

Column 23,
Line 21, “plans” should read -- plane --.

Column 24
Line 8, “current Te” should read -- current Ie --.

Column 27,
Line 32, “device; an” should read -- device; ¶ an --.

UNITED STATES PATENT AND TRADEMARK OFFICE

CERTIFICATE OF CORRECTION

PATENT NO. : 6,656,007 B2

DATED : December 2, 2003

INVENTOR(S) : Masahiro Fushimi et al.

It is certified that error appears in the above-identified patent and that said Letters Patent is hereby corrected as shown below:

Column 28,
Line 10, "disposed;" should read -- disposed, --.

Signed and Sealed this

Second Day of November, 2004

JON W. DUDAS
*Director of the United States Patent and Trademark Office*